(12) United States Patent
Hamano et al.

(10) Patent No.: US 8,681,432 B2
(45) Date of Patent: Mar. 25, 2014

(54) ZOOM LENS AND IMAGE PICKUP APPARATUS EQUIPPED WITH ZOOM LENS

(75) Inventors: Hiroyuki Hamano, Saitama (JP); Arata Sato, Utsunomiya (JP); Ken Wada, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 13/479,104

(22) Filed: May 23, 2012

(65) Prior Publication Data

US 2012/0307373 A1    Dec. 6, 2012

(30) Foreign Application Priority Data

May 31, 2011    (JP) .................................. 2011-121933

(51) Int. Cl.
*G02B 15/14*    (2006.01)
*G02B 15/173*    (2006.01)

(52) U.S. Cl.
CPC ................................... *G02B 15/173* (2013.01)
USPC ......................................... 359/687; 359/686

(58) Field of Classification Search
USPC ................................................. 359/686, 687
See application file for complete search history.

(56) References Cited

U.S. PATENT DOCUMENTS

| 7,782,544 | B2 | 8/2010 | Hoshi |
| 2005/0041304 | A1 | 2/2005 | Suzuki et al. |
| 2010/0302649 | A1* | 12/2010 | Yoshimi et al. ............... 359/686 |

FOREIGN PATENT DOCUMENTS

JP    8271790 A    10/1996

* cited by examiner

*Primary Examiner* — William Choi
(74) *Attorney, Agent, or Firm* — Canon USA Inc. IP Division

(57) ABSTRACT

A zoom lens includes, a first lens unit having positive refractive power, a second lens unit having negative refractive power, a third lens unit having positive refractive power, and a fourth lens unit having positive refractive power. All of the lens units are moved during zooming from a wide-angle end to a telephoto end. An aperture stop is arranged on the image side of the third lens unit. A distance T23 from a lens surface closest to the image side in the second lens unit to a lens surface closest to the object side in the third lens unit when the zoom lens is at the telephoto end, a focal length fT of the entire zoom lens at the telephoto end, and focal lengths f1, f2, and f3 of the first, second, and third lens units, respectively, are set based on predetermined mathematical conditions.

10 Claims, 16 Drawing Sheets

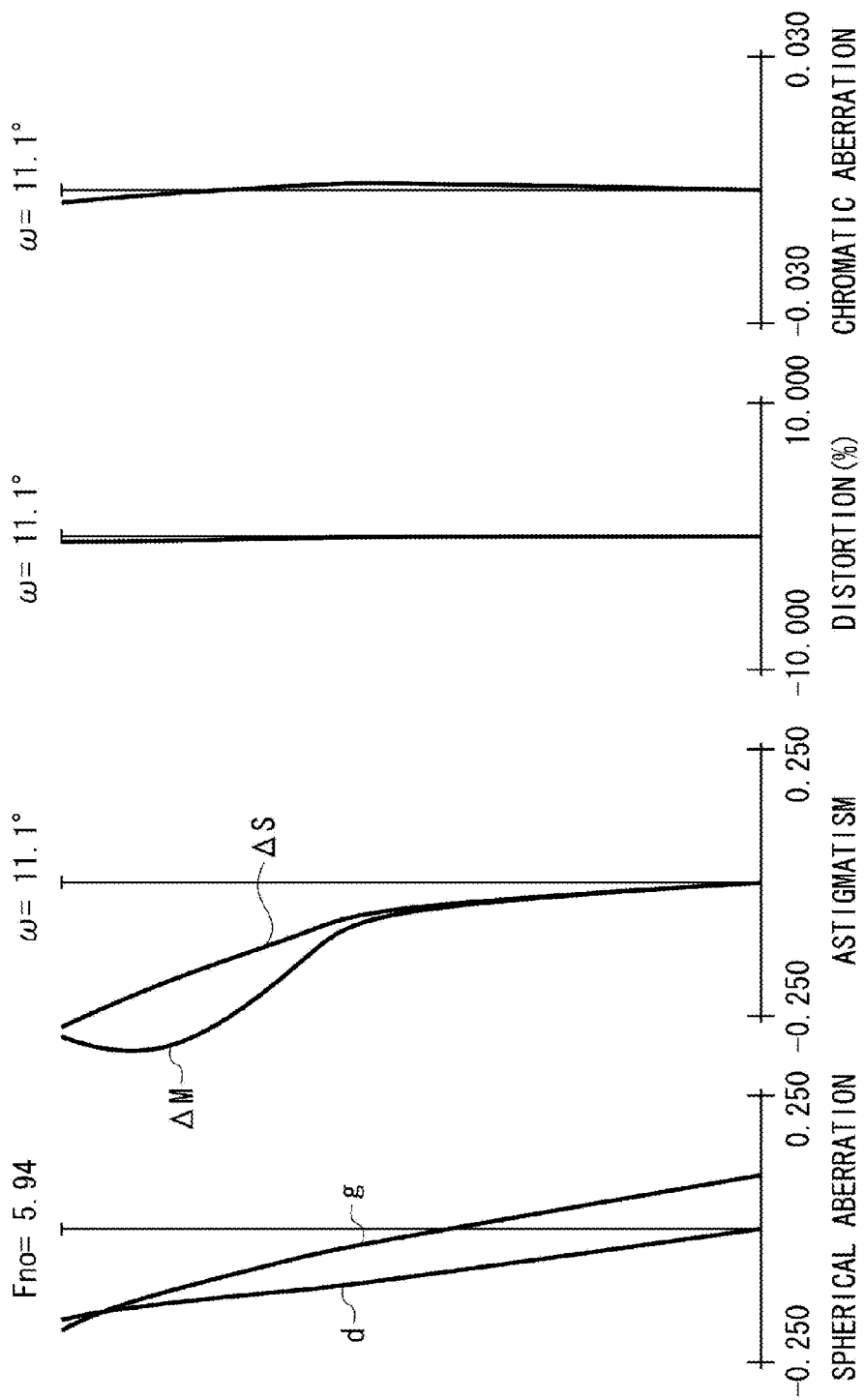

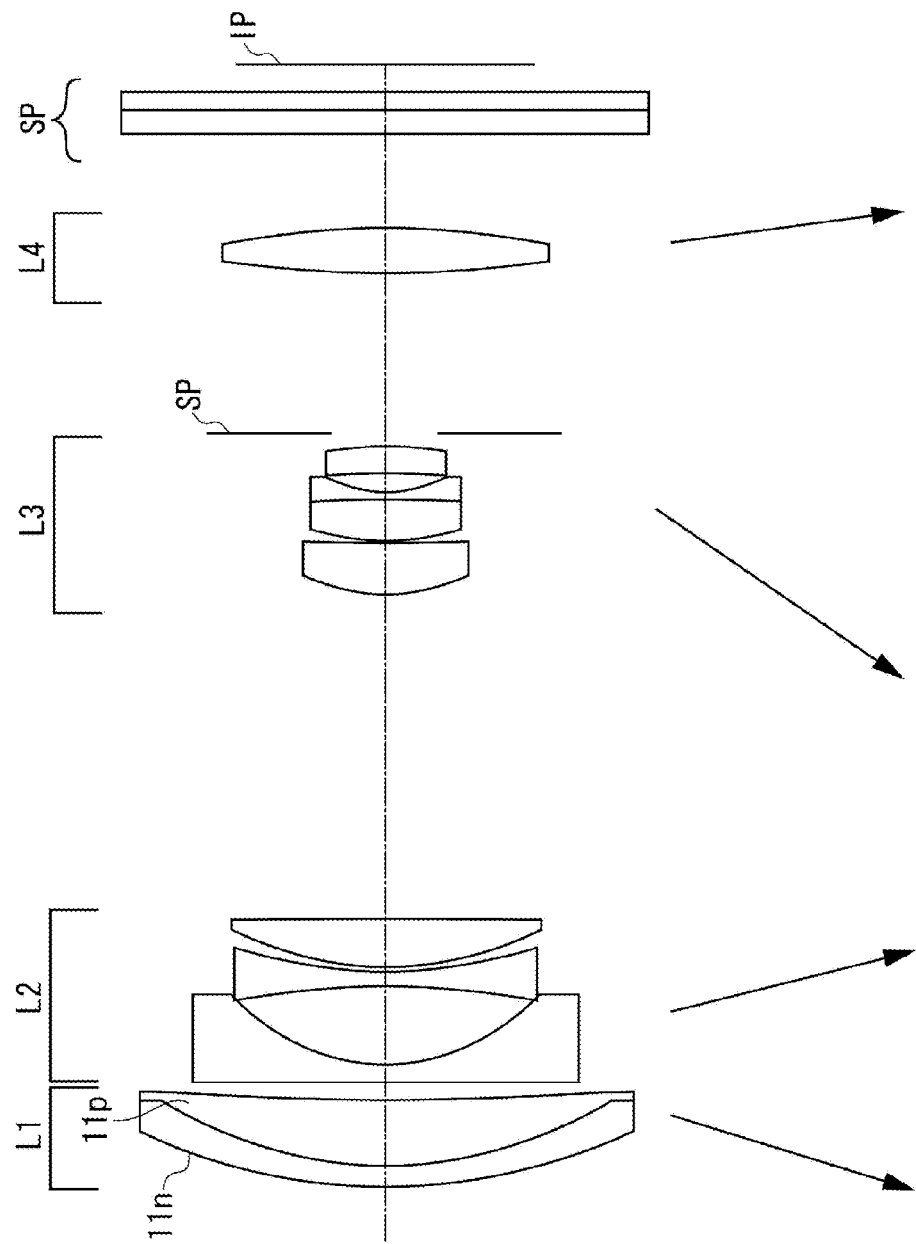

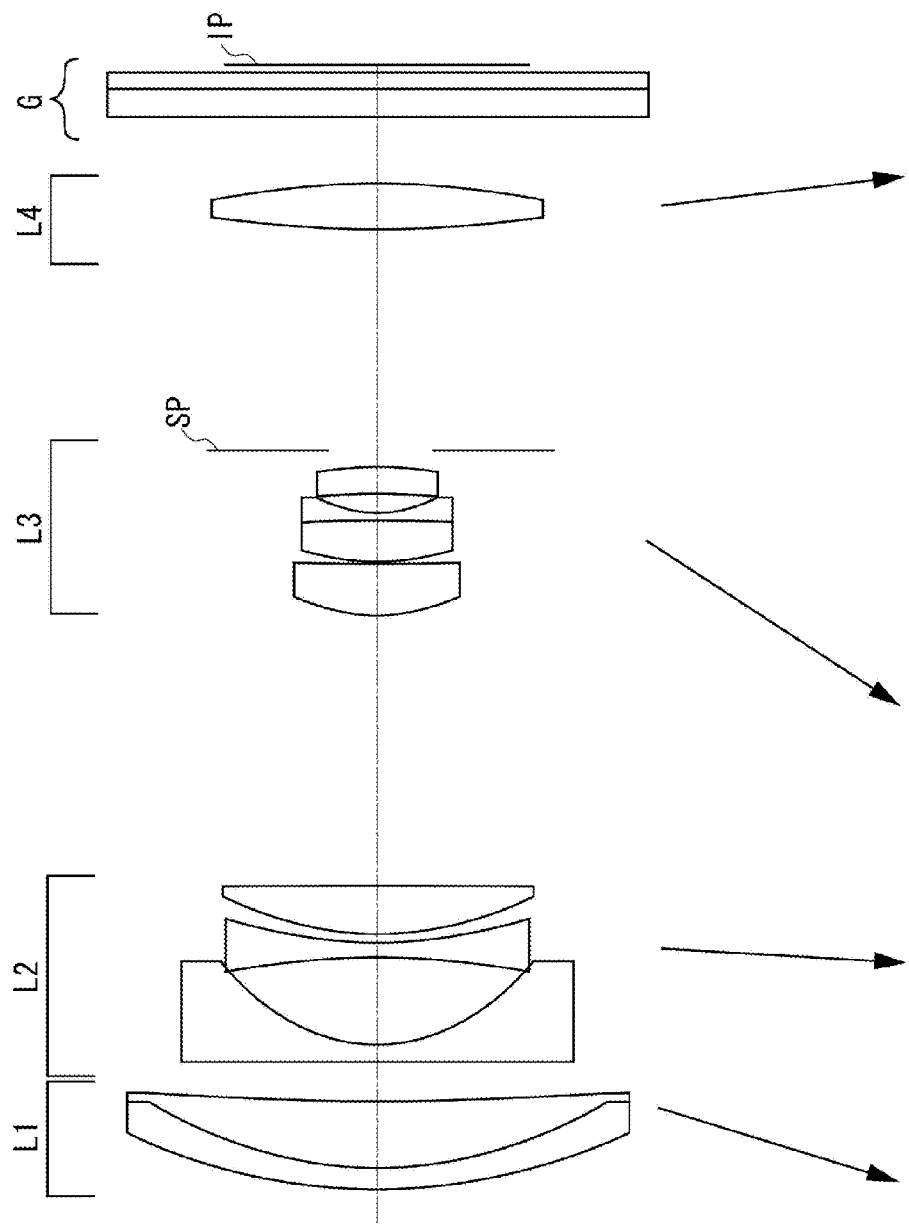

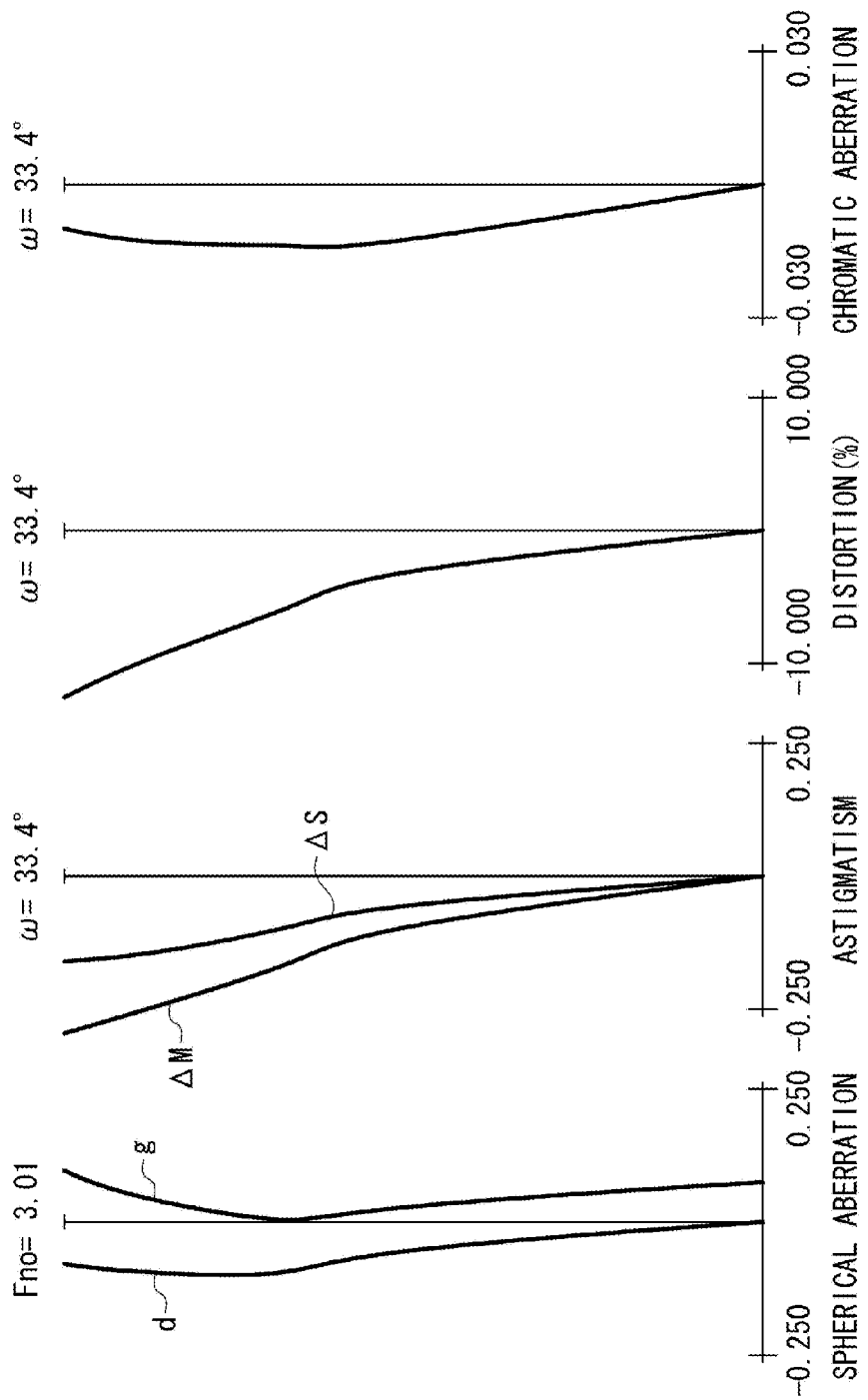

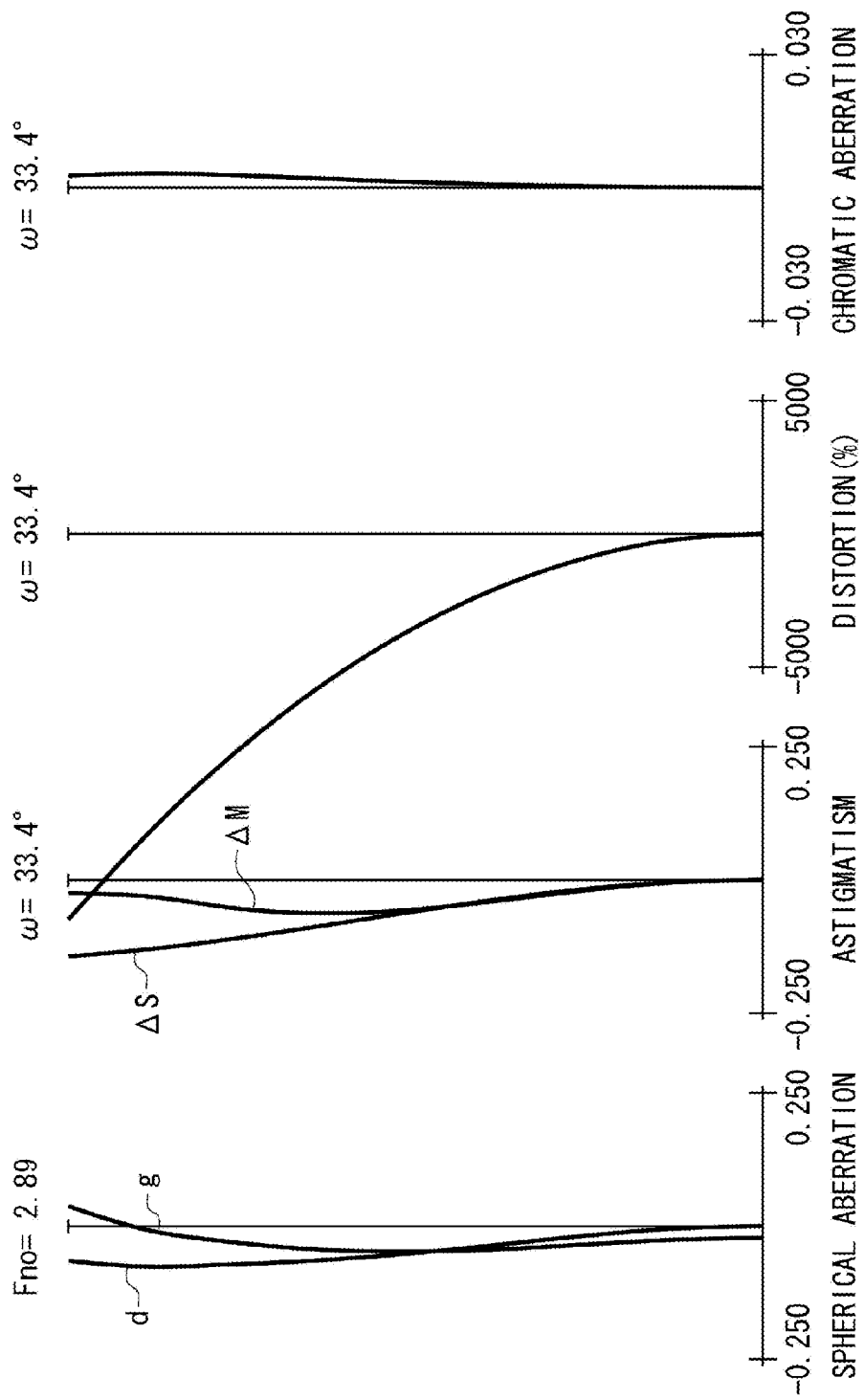

ZOOM LENS AND IMAGE PICKUP APPARATUS EQUIPPED WITH ZOOM LENS

BACKGROUND OF THE INVENTION

1. Field of the Invention

The invention relates to a zoom lens and an image pickup apparatus equipped with the zoom lens, and more particularly, to a zoom lens suitable for a photographic optical system used in an image pickup apparatus such as a video camera, a digital camera, a broadcasting camera, a monitoring camera, or a silver-halide film camera.

2. Description of the Related Art

In recent years, image pickup apparatuses such as video cameras, photographing digital cameras, broadcasting cameras using a solid-state image sensor, and silver-halide film based cameras have been miniaturized while maintaining high functionality. To that end, there has been proposed an image pickup apparatus in which the entire zoom lens is miniaturized without using a quick-return mirror as a monocular interchangeable lens system. In addition, there is a demand for a photographic optical system, in which the entire lens length (a distance from the first lens surface to the image plane) is short, the front lens effective diameter is small, the entire zoom lens is compact, and the zoom lens has a large diameter and a wide angle of view.

In the current state of the art, there is known a four-unit zoom lens including a first lens unit of a positive refractive power, a second lens unit of a negative refractive power, a third lens unit of a positive refractive power, and a fourth lens unit of a positive refractive power in order from an object side to an image side, where each lens unit is moved during zooming. Japanese Patent Application Laid-Open No. 08-271790 and U.S. Patent Application Publication No. 2005/0041304 both disclose a zoom lens in which an aperture stop is arranged on the image side of the third lens unit so that the entire zoom lens is miniaturized.

In addition, there is known a zoom lens having an image stabilizing function in which a part of the lens units are displaced to a direction perpendicular to an optical axis to correct an image shake. U.S. Pat. No. 7,782,544 discusses a zoom lens in which an image shake is corrected by moving the entire third lens unit out of the four-unit zoom lens to a direction perpendicular to an optical axis to obtain a stationary image.

In spite of the current state of the art, a demand exits for a zoom lens having a small outer diameter of the lens barrel, a miniaturized size in entirety, and a large aperture ratio. In general, in order to implement a large aperture ratio and a miniaturized size of the entire zoom lens, it is necessary to increase refractive powers of each lens unit of the zoom lens and reduce movement amounts of each lens unit during zooming. However, in the zoom lens configured in such a manner, as the refractive powers of each lens surface increase, the lens thickness also increases. Therefore, an effect of reducing the lens system is insufficient, and it is difficult to correct various kinds of aberration.

In the four-unit zoom lens described above, it is important to appropriately set the refractive powers of each lens unit, a position of the aperture stop, a lens configuration of the first and third lens units, and the like in order to obtain both the miniaturized size in the entire lens system and the large aperture ratio. If the position of the aperture stop or the lens configuration of the lens unit arranged in the vicinity of the aperture stop, for example, the third lens is not appropriate, it is difficult to obtain a large aperture ratio, a reduced front lens effective diameter, a reduced lens barrel diameter, and a miniaturized size of the entire zoom lens.

SUMMARY OF THE INVENTION

Aspects of the present invention are directed to a zoom lens having a large aperture ratio, a miniaturized size of the entire zoom lens, and excellent optical performance across the entire zoom range from the wide-angle end to the telephoto end and an image pickup apparatus equipped with the zoom lens.

According to an aspect of the present invention, a zoom lens includes, in order from an object side to an image side, a first lens unit having positive refractive power, a second lens unit having negative refractive power, a third lens unit having positive refractive power, and a fourth lens unit having positive refractive power, all of the lens units being moved during zooming from a wide-angle end to a telephoto end, wherein an aperture stop is arranged on the image side of the third lens unit, the third lens unit includes at least three positive lenses and one negative lens, and the zoom lens satisfies the following conditions:

$$0.002 < T23/fT < 0.020$$

$$-1.8 < f3/f2 < -0.8, \text{ and}$$

$$-5.0 < f1/f2 < -3.0,$$

where T23 denotes a distance from a lens surface closest to the image side in the second lens unit to a lens surface closest to the object side in the third lens unit when the zoom lens is at the telephoto end, fT denotes a focal length of the entire zoom lens at the telephoto end, and f1, f2, and f3 denote focal lengths of the first, second, and third lens units, respectively.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are aberration charts of the zoom lens at the wide-angle end and the telephoto end, respectively, according to Numerical Example 1 corresponding to the first exemplary embodiment of the invention.

FIG. 3 is a lens cross-sectional view illustrating the zoom lens at the wide-angle end, according to a second exemplary embodiment of the invention.

FIG. 5 is a lens cross-sectional view illustrating the zoom lens at the wide-angle end, according to a third exemplary embodiment of the invention.

FIGS. 6A and 6B are aberration charts of the zoom lens at the wide-angle end and the telephoto end, respectively, according to Numerical Example 3 corresponding to the third exemplary embodiment of the invention.

FIGS. 10A and 10B are aberration charts of the zoom lens at the wide-angle end and the telephoto end, respectively, according to Numerical Example 5 corresponding to the fifth exemplary embodiment of the invention.

DESCRIPTION OF THE EMBODIMENTS

Various exemplary embodiments, features, and aspects of the invention will be described in detail below with reference to the drawings.

The zoom lens according to an exemplary embodiment of the invention includes, in order from an object side to an image side, a first lens unit of a positive refractive power, a second lens unit of a negative refractive power, a third lens unit of a positive refractive power, and a fourth lens unit of a positive refractive power, and overall lens units are moved during zooming. An aperture stop for limiting the light flux for determining an F-number is arranged on the image side of the third lens unit. The aperture stop moves integrally or independently with the third lens unit during zooming. The third lens unit includes at least three positive lenses and one negative lens.

Figure 1:
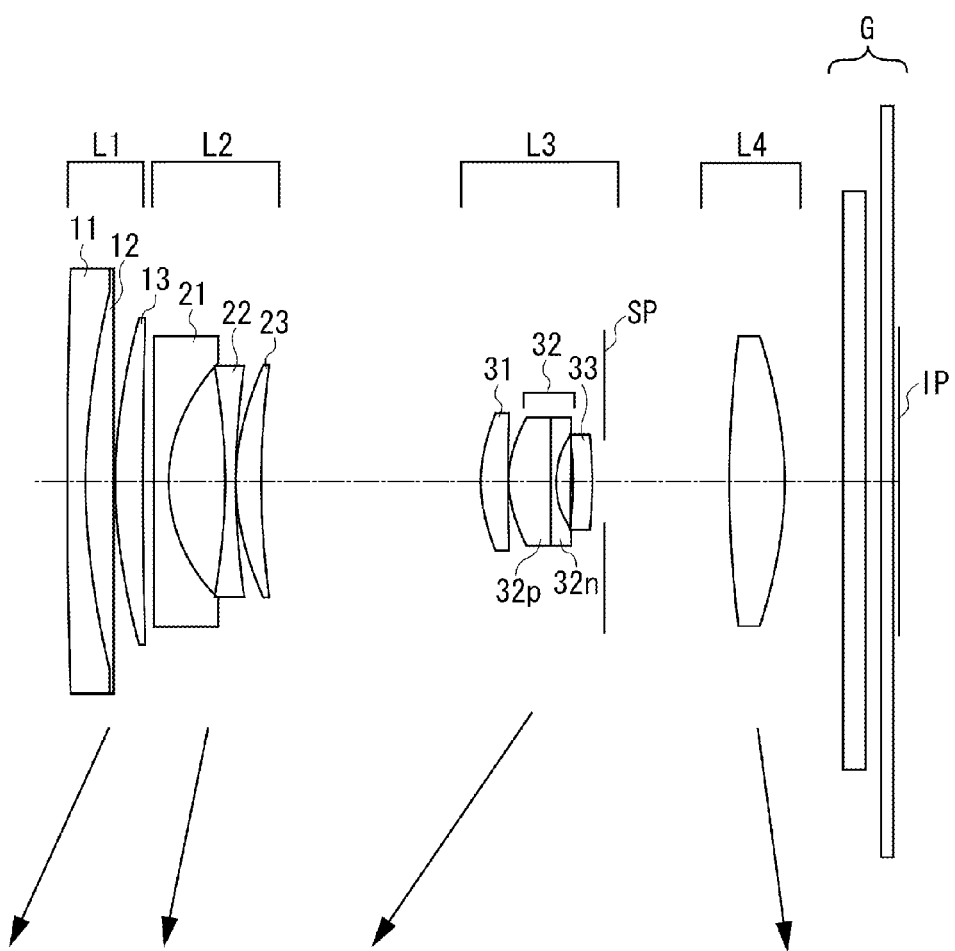
FIG. 1 is a lens cross-sectional view illustrating a zoom lens at the wide-angle end, according to a first exemplary embodiment of the invention.
Figure 2A:
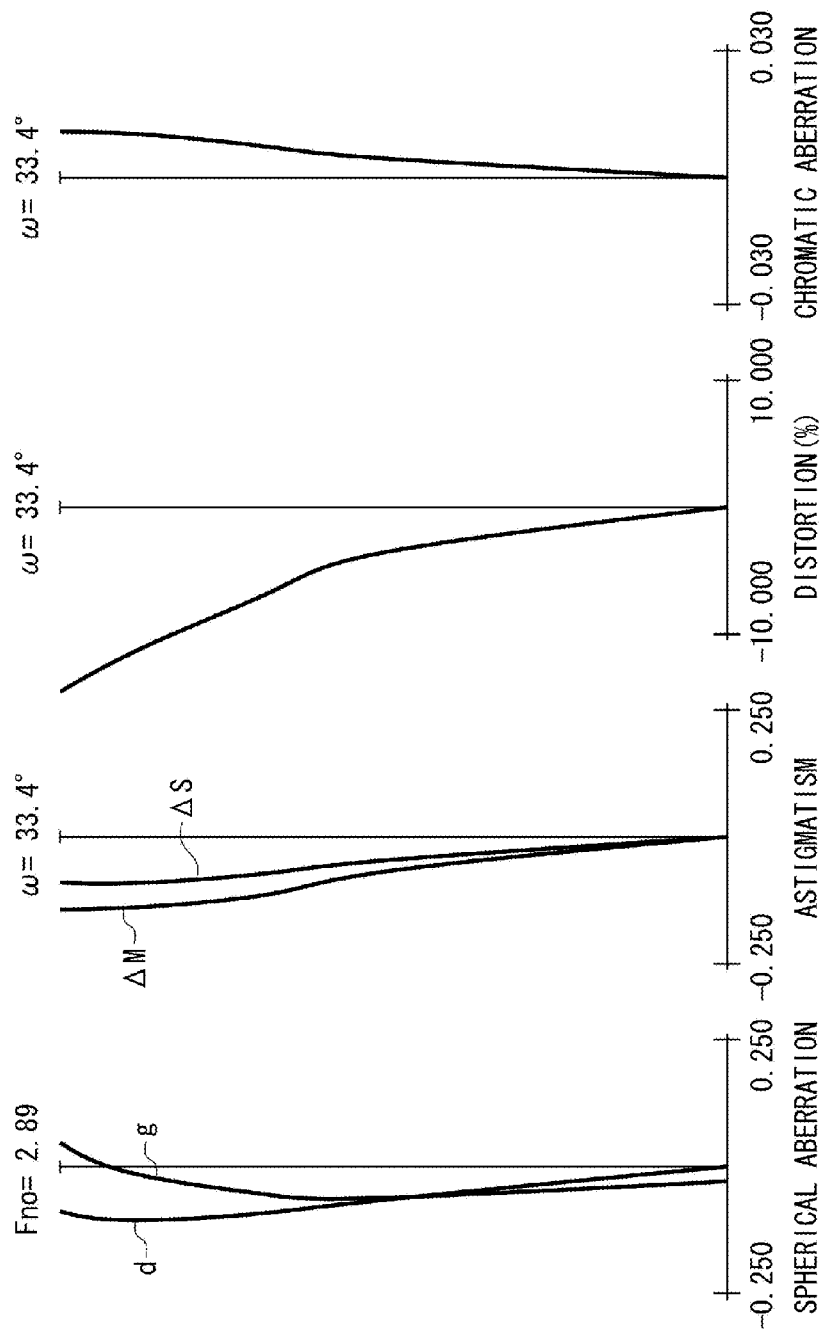

FIG. 1 is a lens cross-sectional view illustrating a zoom lens according to the first exemplary embodiment of the invention at the wide-angle end (short focal length end). FIGS. 2A and 2B are aberration charts of the zoom lens according to the first exemplary embodiment of the invention at the wide-angle end and the telephoto end (long focal length end), respectively.

Figure 4A:
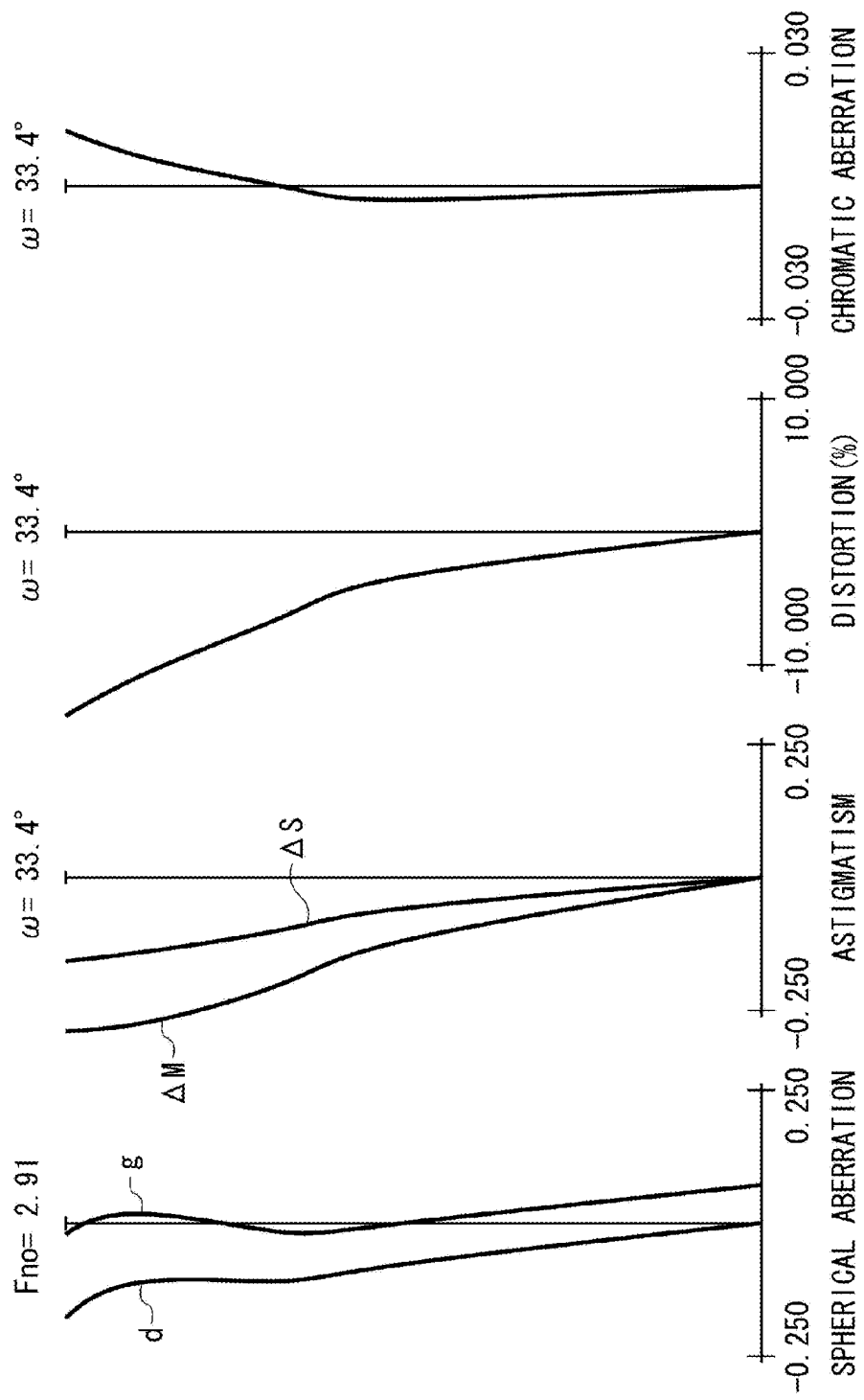
FIGS. 4A and 4B are aberration charts of the zoom lens at the wide-angle end and the telephoto end, respectively, according to Numerical Example 2 corresponding to the second exemplary embodiment of the invention.
Figure 4B:
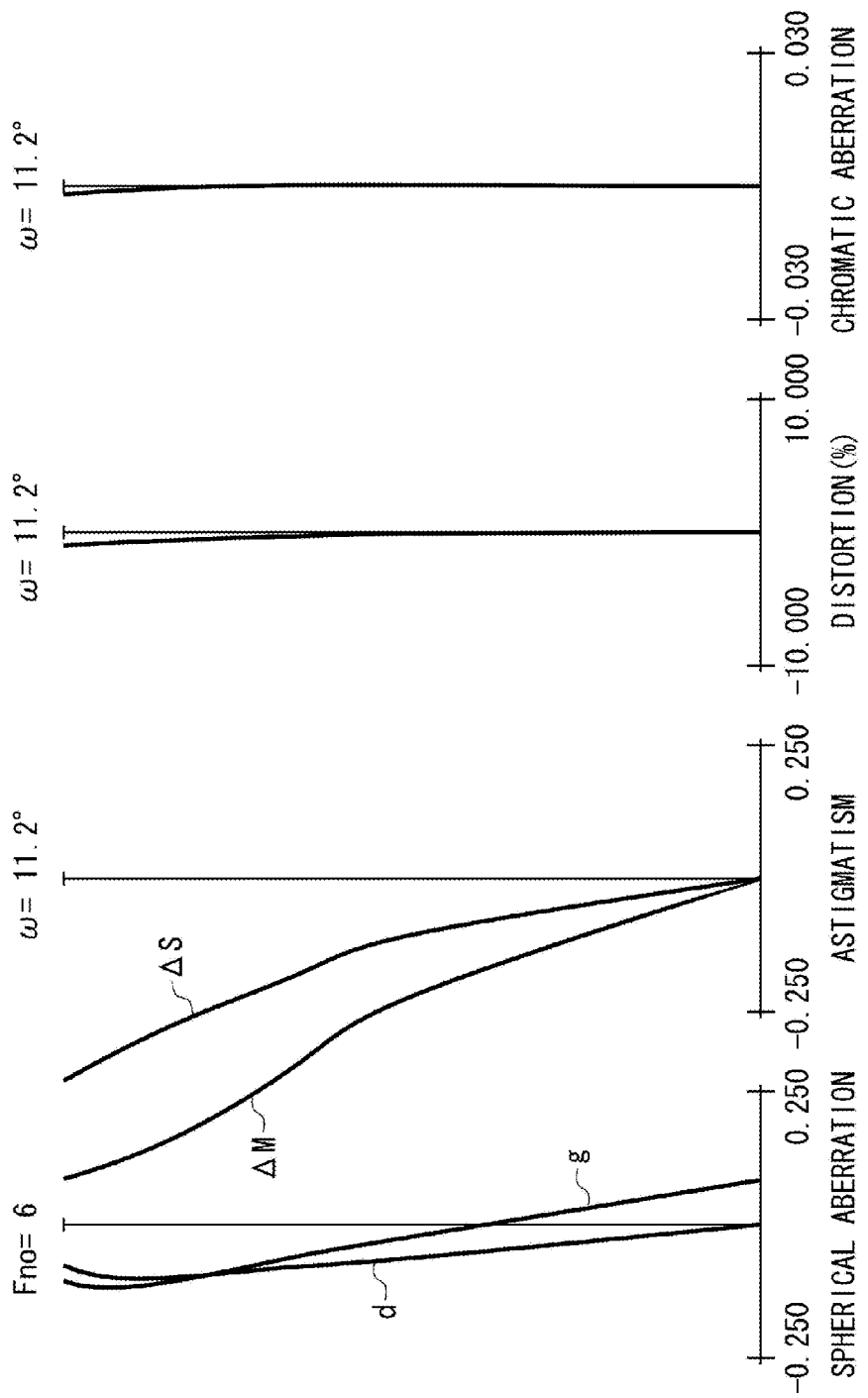
Figure 6B:
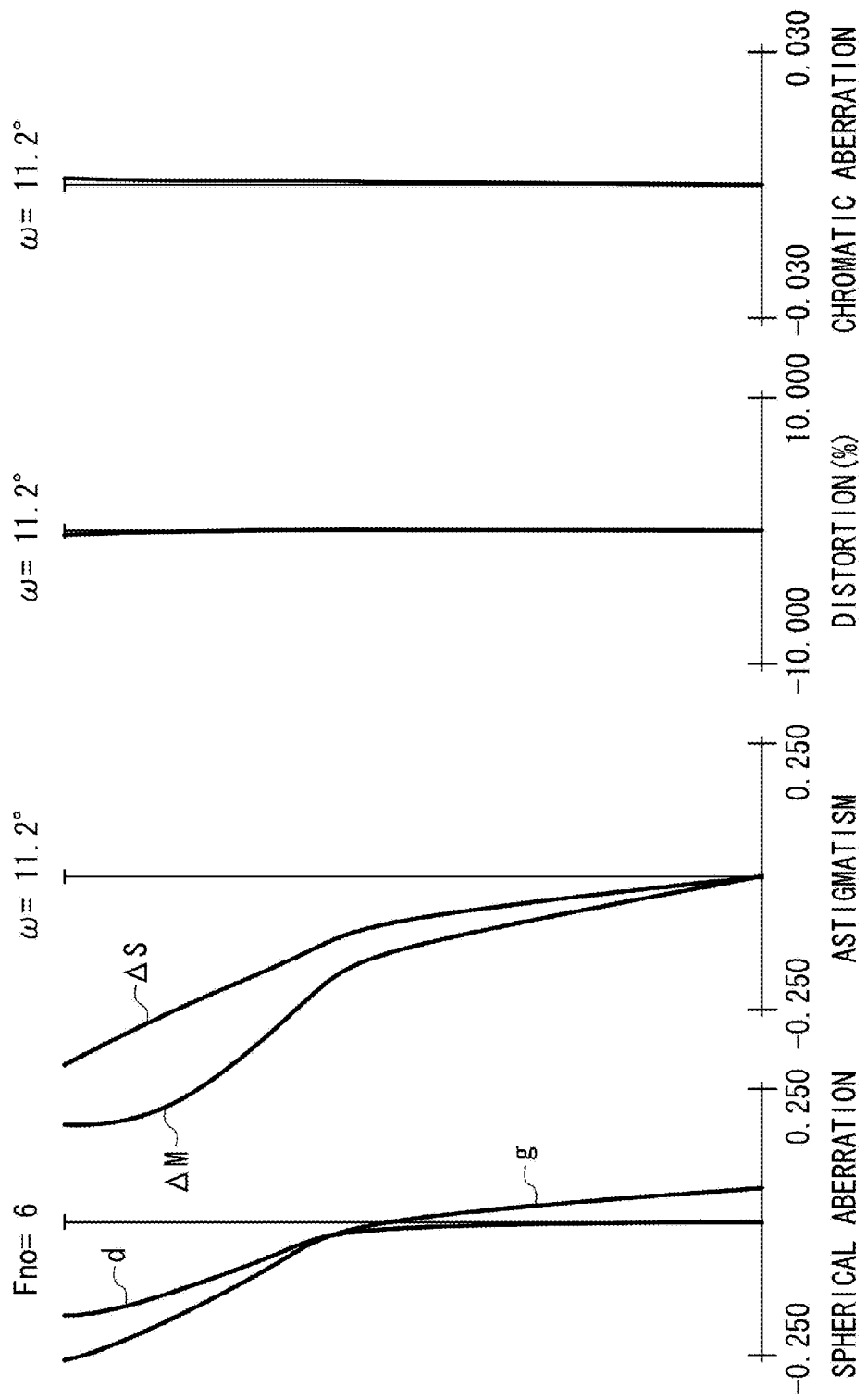
Figure 7:
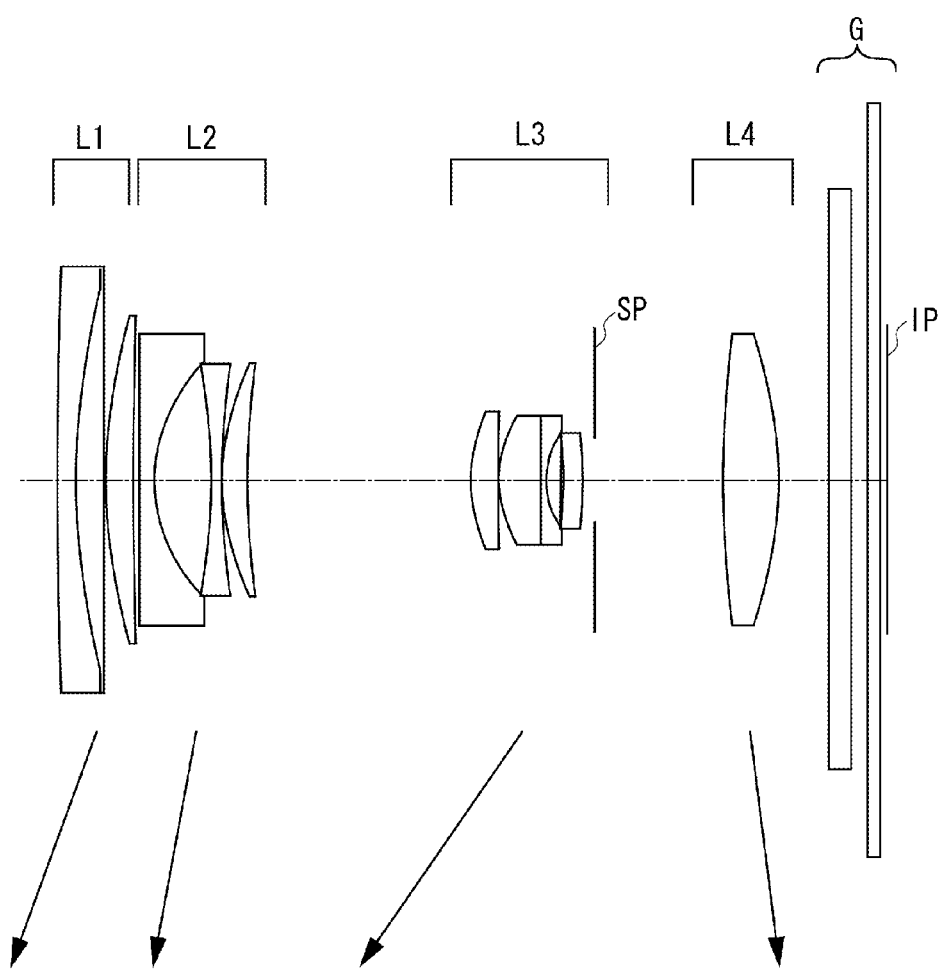
FIG. 7 is a lens cross-sectional view illustrating the zoom lens at the wide-angle end, according to a fourth exemplary embodiment of the invention.
Figure 8A:
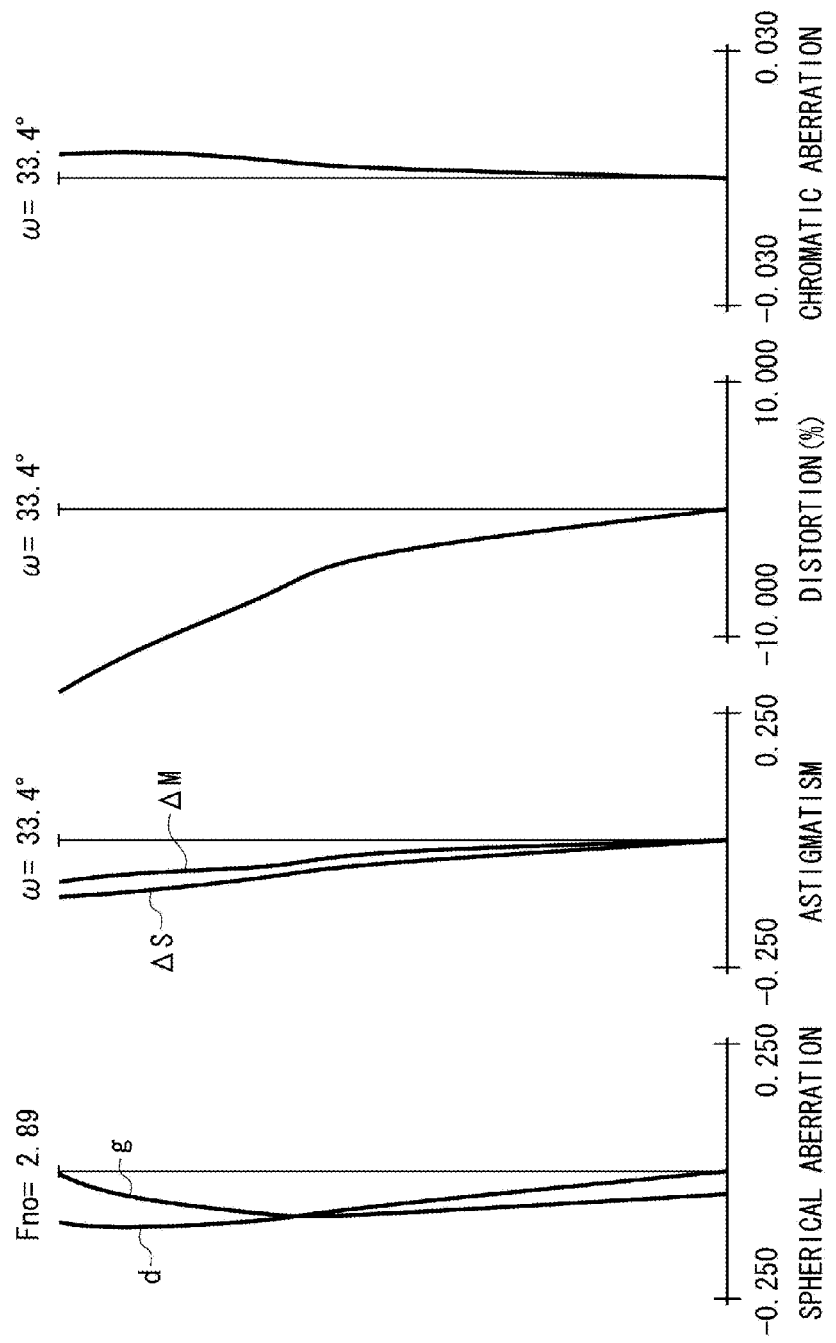
FIGS. 8A and 8B are aberration charts of the zoom lens at the wide-angle end and the telephoto end, respectively, according to Numerical Example 4 corresponding to the fourth exemplary embodiment of the invention.
Figure 8B:
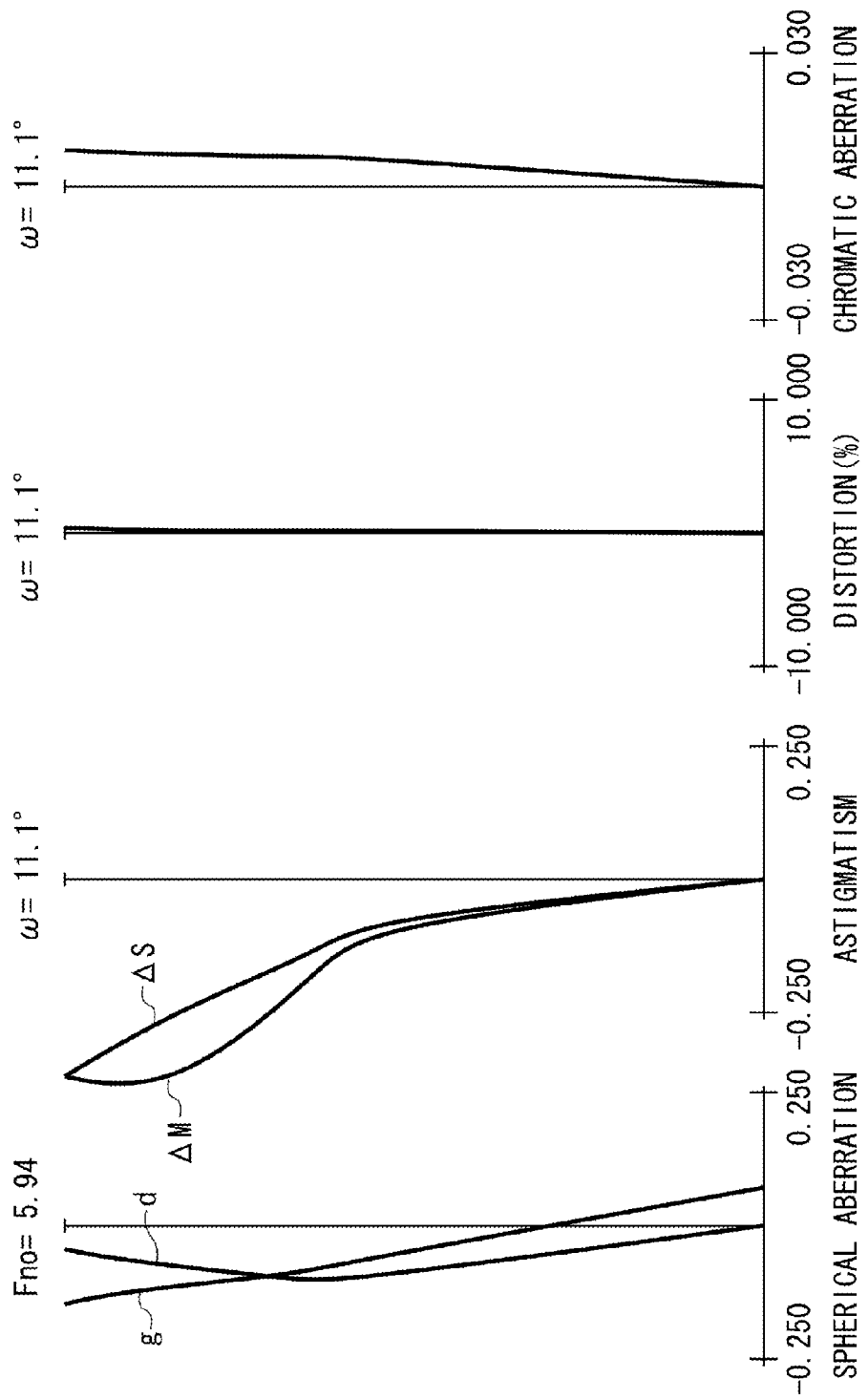

FIG. 3 is a lens cross-sectional view illustrating the zoom lens according to the second exemplary embodiment of the invention at the wide-angle end. FIGS. 4A and 4B are aberration charts of the zoom lens according to the second exemplary embodiment of the invention at the wide-angle end and the telephoto end, respectively. FIG. 5 is a lens cross-sectional view illustrating the zoom lens according to the third exemplary embodiment of the invention at the wide-angle end. FIGS. 6A and 6B are aberration charts of the zoom lens according to the third exemplary embodiment of the invention at the wide-angle end and the telephoto end, respectively. FIG. 7 is a lens cross-sectional view illustrating the zoom lens according to the fourth exemplary embodiment of the invention at the wide-angle end. FIGS. 8A and 8B are aberration charts of the zoom lens according to the fourth exemplary embodiment of the invention at the wide-angle end and the telephoto end, respectively.

Figure 9:
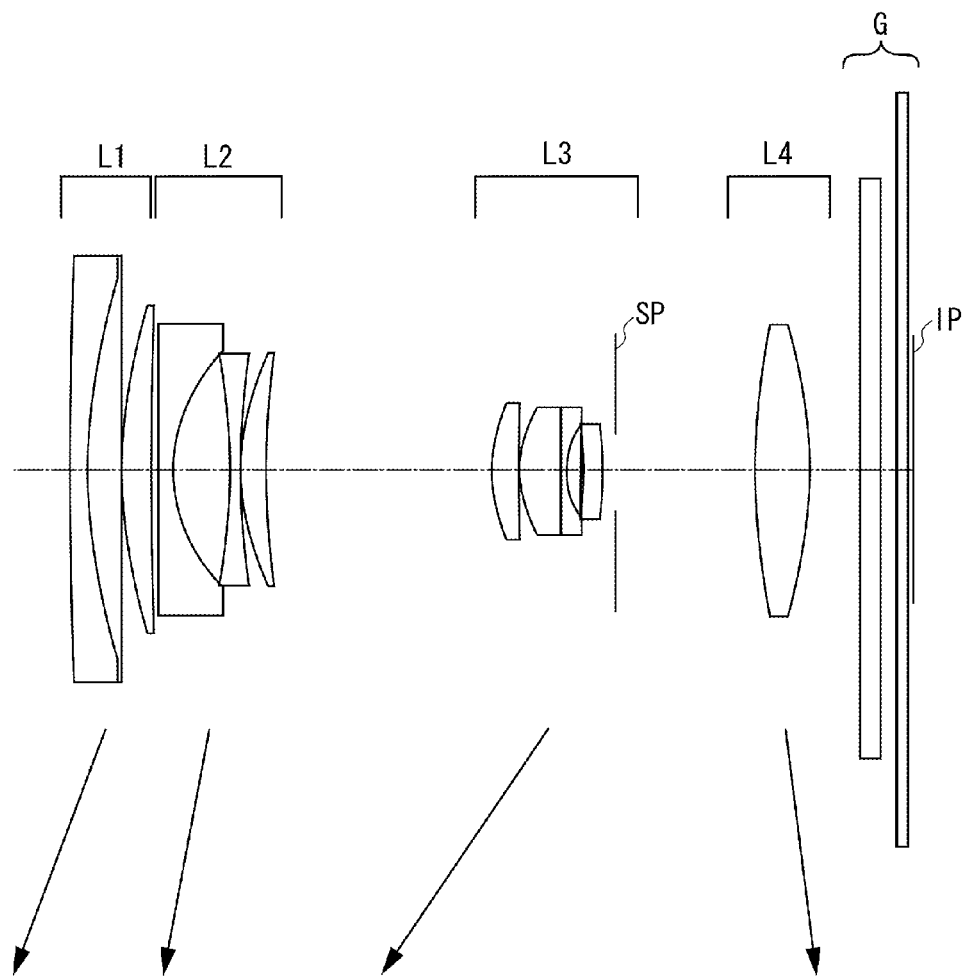
FIG. 9 is a lens cross-sectional view illustrating the zoom lens at the wide-angle end, according to a fifth exemplary embodiment of the invention.
Figure 10B:
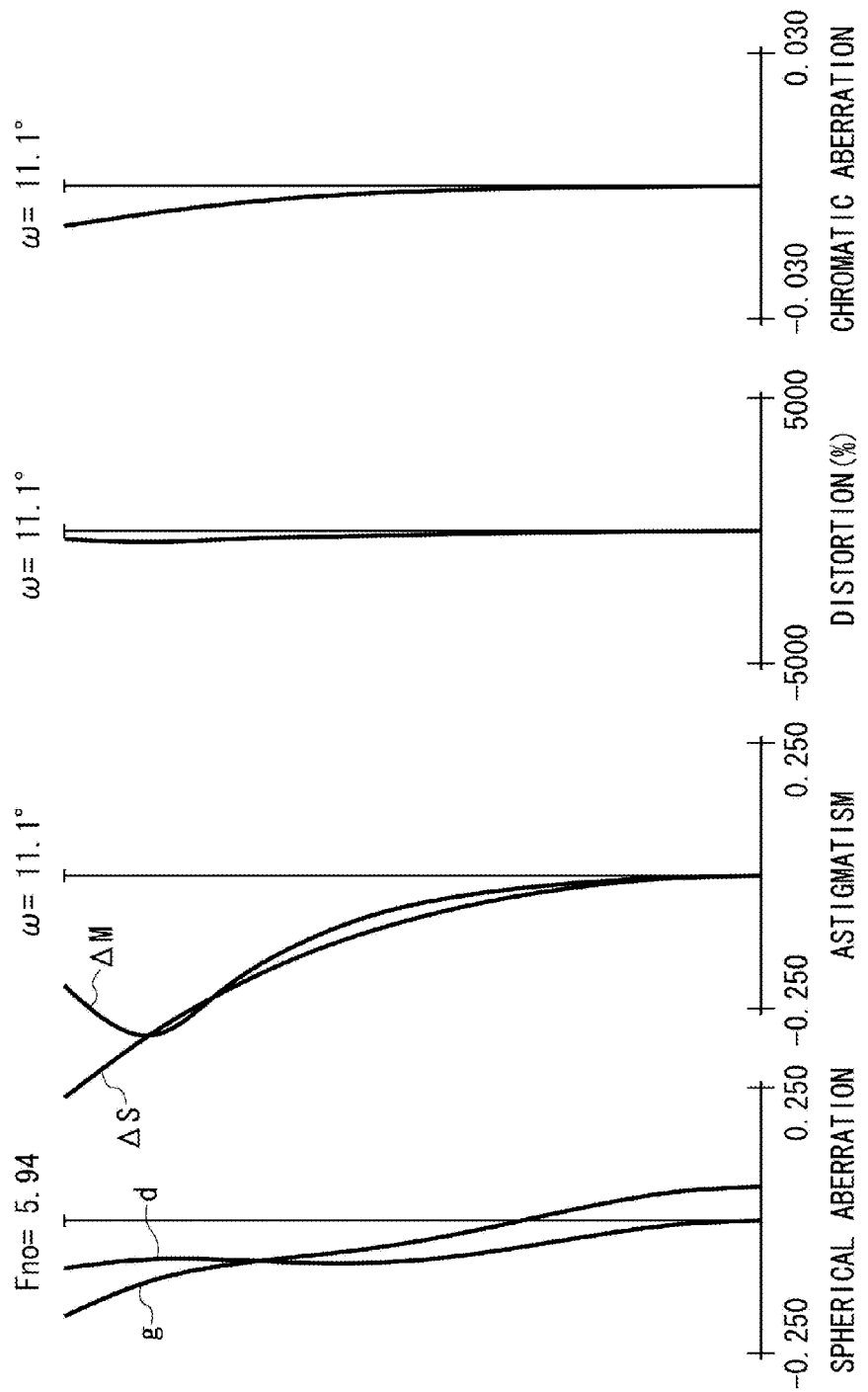
Figure 11:
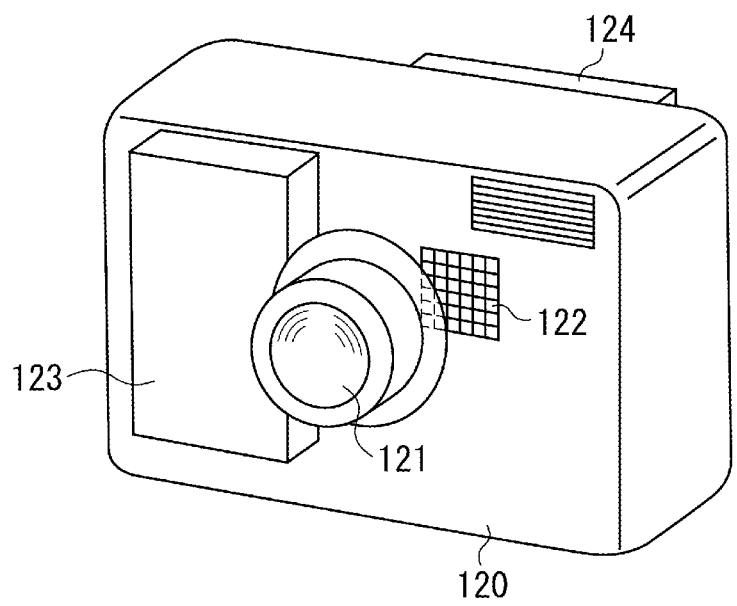
FIG. 11 is a schematic diagram illustrating an image pickup apparatus according to an exemplary embodiment of the invention.

FIG. 9 is a lens cross-sectional view illustrating the zoom lens according to the fifth exemplary embodiment of the invention at the wide-angle end. FIGS. 10A and 10B are aberration charts of the zoom lens according to the fifth exemplary embodiment of the invention at the wide-angle end and the telephoto end, respectively. FIG. 11 is a schematic diagram illustrating main parts of a camera (image pickup apparatus) equipped with the zoom lens according to an exemplary embodiment of the invention. The zoom lens of each exemplary embodiment is a photographic optical system used in the image pickup apparatus such as a video camera, a digital camera, and a silver-halide film camera.

In the lens cross-sectional views, the left side refers to an object side (front side), and the right side refers to an image side (rear side). i denotes the order of the lens units from the object side, and Li denotes the i-th lens unit. In each exemplary embodiment, L1 denotes a first lens unit of a positive refractive power (optical power=inverse of focal length), L2 denotes a second lens unit of a negative refractive power, L3 denotes a third lens unit of a positive refractive power, and L4 denotes a fourth lens unit of a positive refractive power.

SP denotes an aperture stop, which is arranged on the image side of the third lens unit L3. The aperture stop SP moves integrally or independently with the third lens unit L3 during zooming. G denotes an optical block corresponding to an optical filter, a phase plate, a crystal low-pass filter, an infrared cut-off filter, and the like. IP denotes an image plane, which is a photosensitive surface corresponding to an image pickup plane of a solid-state image sensor (photoelectric conversion element) such as a CCD sensor or a CMOS sensor when it is used as a photographic optical system of a video camera or a digital camera or corresponding to a film surface when it is used as a silver-halide film camera.

In the aberration charts, d and g denote the Fraunhofer d-line and g-line, respectively, and ΔM and ΔS denote a meridional image plane and a sagittal image plane, respectively. Chromatic aberration of magnification is represented by g-line. ω denotes a half angle of view (measured in degrees), and Fno denotes an F-number. In each exemplary embodiment described below, the wide-angle end and the telephoto end refer to zoom positions when the zoom lens unit (second lens unit L2) is positioned in respective ends within the movable range on an optical axis of a mechanism.

In each exemplary embodiment, each unit is moved along a locus as indicated by the solid arrows during zooming from the wide-angle end to the telephoto end. Specifically, in each exemplary embodiment, the first lens unit L1 is moved towards the object side as indicated by the arrow during zooming from the wide-angle end to the telephoto end. In addition, the second lens unit L2 is moved towards the object side or the image side, the third lens unit L3 is moved towards the object side, and the fourth lens unit L4 is moved towards the image side. Focusing from an infinitely-distant object to a close object is performed by moving the fourth lens unit L4 forward (towards the object side).

In each exemplary embodiment, fast focusing, for example, automatic focus detection is easily performed by moving the fourth lens unit L4, which is light-weighted, for focusing. In the four-unit zoom lens having four lens units of the zoom type described above, an outer diameter of the lens barrel is usually determined by two factors of an aperture diameter of the aperture stop SP and a front lens effective diameter.

As an aperture diameter increases, an influence of the aperture diameter on the aperture stop SP increases. As an angle of view is widened, an influence of the front lens effective diameter increases. In order to miniaturize the entire zoom lens while excellent optical performance is maintained, it is important to set these two factors with an excellent balance. To reduce a size of the aperture diameter, it is more useful to arrange the aperture stop SP on the image side of the third lens unit L3 than to arrange it between the second and third lens units L2 and L3. Meanwhile, if the aperture diameter is arranged on the image side of the third lens unit L3, a distance between the first lens unit L1 and the aperture stop SP increases, and a position where the off-axis ray passes through the first lens unit L1 is raised at the wide-angle end so that the front lens effective diameter increases.

In order to reduce the aperture diameter and the front lens effective diameter while maintaining excellent optical performance, it is useful to reduce the movement amount of the third lens unit L3 during zooming from the wide-angle end to the telephoto end. In this case, it is effective to increase the zooming effect for the movement amount of the third lens unit L3 by increasing the refractive power of the third lens unit L3. In addition, it is effective to increase a contribution of variable power of the first lens unit with respect to a variation of the distance between the first and second lens units L1 and L2 during zooming by increasing the refractive power of the first lens L1.

If the refractive power of the third lens unit L3 increases, it is necessary to reduce aberration generated by the third lens unit L3 in order to reduce a variation of the aberration caused by the movement during zooming of the third lens unit L3. In addition, in order to reduce the front lens effective diameter, it is useful to increase the refractive index of a material of the first lens unit L1 and reduce the principal point interval between the first and second lens units L1 and L2 by reducing the thickness of the first lens unit L1.

In this regard, in each exemplary embodiment, the following configuration is provided. That is, the following conditions are satisfied:

$$0.002 < T23/fT < 0.020 \quad (1),$$

$$-1.8 < f3/f2 < -0.8 \quad (2), \text{ and}$$

$$-5.3 < f1/f2 < -3.0 \quad (3),$$

where T23 denotes a distance from a lens surface closest to the image side in the second lens unit L2 to a lens surface closest to the object side in the third lens unit L3 when the zoom lens is at telephoto end, fT denotes a focal length of the entire zoom lens at the telephoto end, and f1, f2, and f3 denote focal lengths of the first, second, and third lens units, respectively.

Next, technical meanings of the conditions (1) to (3) will be described. The condition (1) relates to a distance (lens interval) between the second and third lens units L2 and L3 at the telephoto end. If the lens interval is reduced with the lower limit of the condition (1) exceeded, the lens barrels of the second and third lens units L2 and L3 disadvantageously interfere with each other at the telephoto end.

On the contrary, if the lens interval increases with the upper limit of the condition (1) exceeded, the aperture diameter for obtaining an axial light ray increases as a lens diameter increases. Since a distance between the aperture stop SP and the front lens (first lens unit L1) at the wide-angle end also increases, the front lens effective diameter disadvantageously increases. More usefully, it is possible to further facilitate miniaturization of the entire zoom lens by setting the numerical range of the condition (1) as follows:

$$0.003 < T23/fT < 0.018 \quad (1a)$$

The condition (2) relates to a relation between refractive powers of the second and third lens units L2 and L3 and defines a level of contribution of variable power of the second and third lens units L2 and L3 and a limit of the aberration correction. If the refractive power of the third lens unit L3 increases with the lower limit of the condition (2) exceeded, coma caused by the movement of the third lens unit L3 during zooming increases, and the correction thereof becomes difficult. In addition, the Petzval sum increases in the positive direction, and it is difficult to correct curvature of field.

On the contrary, if the refractive power of the third lens unit L3 decreases with the upper limit of the condition (2) exceeded, the movement amount of the third lens unit L3 during zooming increases, a distance between the first lens surface and the aperture stop SP at the wide-angle end increases, and the front lens effective diameter disadvantageously increases. More usefully, it is possible to further facilitate miniaturization of the entire zoom lens if the numerical range of the condition (2) is set as follows:

$$-1.6 < f3/f2 < -1.0 \quad (2a)$$

More usefully, the numerical range of the condition 2(a) is set as follows:

$$-1.4 < f3/f2 < -1.1 \quad (2b)$$

The condition (3) relates to a relative relation between the refractive powers of the first and second lens units L1 and L2 and is to appropriately set the movement amounts of each lens unit based on the relative relation between the refractive powers of the first and second lens units L1 and L2.

If the refractive power of the first lens unit L1 increases with the lower limit of the condition (3) exceeded, it is advantageous in miniaturization of the entire zoom lens. However, an influence of the perpendicularity of the first lens unit L1 for astigmatism or curvature of field at the telephoto end excessively increases so that a variation caused by a manufacturing error increases. On the contrary, if the refractive power of the first lens unit L1 decreases with the upper limit of the condition (3) exceeded, the movement amount of the first lens unit L1 necessary for zooming increases. Particularly, the entire lens length at the telephoto end disadvantageously increases.

More usefully, it is possible to further facilitate miniaturization of the entire zoom lens if the numerical range of the condition (3) is set as follows:

$$-5.0 < f1/f2 < -3.2 \quad (3a)$$

More usefully, the numerical range of the condition (3a) is set as follows:

$$-4.8 < f1/f2 < -3.4 \quad (3b)$$

In each exemplary embodiment, the following condition is usefully satisfied. Here, Nav1 denotes an average refractive index of materials of positive lenses included in the first lens unit L1.

$$Nav1 > 1.75 \quad (4)$$

Here, the average refractive index Nav1 is a refractive index of a single material if the first lens unit L1 has only a single (one) positive lens.

The condition (4) relates to an average refractive index of materials of positive lenses of the first lens unit L1. If the average refractive index of materials of positive lenses of the first lens unit L1 decreases with the lower limit of the condition (4) exceeded, the thickness of the first lens unit L1 increases. In this case, in order to maintain the distance between the first and second lens units L1 and L2 at the wide-angle end without interference, the principal point interval increases. This disadvantageously increases the front lens effective diameter. Accordingly, to prevent such disadvantages, the lower limit of the condition (4) may be set as follows:

$$Nav1 > 1.76 \quad (4a)$$

As described above, according to each exemplary embodiment, it is possible to obtain a zoom lens having high optical performance while the aperture diameter, the front lens effective diameter, and the lens barrel diameter are reduced. In particular, it is possible to easily implement a miniaturized zoom lens having a large aperture diameter of an F-number of approximately F2.8 while the lens barrel diameter is maintained in a small size.

Hereinafter, a configuration of the zoom lens according to the first exemplary embodiment of the invention will be described with reference to FIG. 1. The zoom lens of the present exemplary embodiment is installed in an image pickup apparatus such as a digital camera. The zoom lens of the present exemplary embodiment includes a first lens unit L1 of a positive refractive power, a second lens unit L2 of a negative refractive power, a third lens unit L3 of a positive refractive power, and a fourth lens unit L4 of a positive refractive power in order from an object side to an image side.

According to the present exemplary embodiment, each lens unit is moved as indicated by the arrow during zooming from the wide-angle end to the telephoto end to obtain a predetermined zoom ratio and miniaturization of the entire zoom lens. By arranging the aperture stop SP on the image side of the third lens unit L3 and moving the aperture stop SP in synchronization with the third lens unit L3, the effective diameter of the aperture stop SP is reduced while a large aperture ratio of an F-number of approximately F2.8 is maintained at the wide-angle end.

The first, second, and third lens units L1, L2, and L3 are moved towards the object side during zooming from the wide-angle end to the telephoto end. The front lens effective diameter is reduced by appropriately setting the refractive index and the movement amount of the first lens unit L1. In addition, by appropriately setting the refractive index and the movement amount of the third lens unit L3, the aperture stop SP is arranged on the image side of the third lens unit L3, and an increase of the front lens effective diameter is suppressed. The first lens unit L1 includes, in order from the object side to the image side, a cemented lens, obtained by cementing a negative lens having a concave surface facing the image side and a positive lens, and a positive lens.

According to the present exemplary embodiment, the thickness of the first lens unit L1 is reduced, and the front lens effective diameter is reduced by increasing the refractive index of the material of the positive lens of the first lens unit L1. It is effective to reduce the entire lens length at the telephoto end in order to miniaturize the entire zoom lens by retracting the lens barrel when it is not used (for imaging).

According to the present exemplary embodiment, since the first lens unit L1 includes three lenses 11, 12 and 13, it is possible to increase the refractive power of the first lens unit L1 and reduce the entire lens length at the telephoto end. Although the first lens unit L1 is moved towards the object side during zooming from the wide-angle end to the telephoto end, it may be moved towards the object side after slightly moved towards the image side in the vicinity of the wide-angle end. By moving the first lens unit L1 along such a non-illustrated locus, it is possible to further facilitate a reduction of the front lens effective diameter. In the present embodiment, as illustrated in FIG. 1, the first lens unit L1 may specifically include, in order from the object side to the image side, a cemented lens obtained by cementing a negative lens 11 and a positive lens 12; and a positive lens 13 other than the cemented lens.

The second lens unit L2 includes, in order from the object side to the image side, a negative lens 21 having a concave surface facing the image side, a negative lens 22 having a bi-concave shape, and a positive lens 23 having a convex surface facing the object side. Since both lens surfaces of the negative lens 21 in the second lens unit L2 have an aspheric shape, it is possible to effectively correct curvature of field occurring at the wide-angle end. That is, in the second lens unit L2, both surfaces of the negative lens closest to the object side have aspherical shape.

The third lens unit L3 includes, in order from the object side to the image side, a positive lens 31 having a convex surface facing the object side, a cemented lens 32 obtained by cementing a positive lens 32$p$ having a convex surface facing the object side and a negative lens 32$n$ having a concave surface facing the image side, and a positive lens 33 having a convex surface facing the image side. As a result, it is possible to appropriately correct spherical aberration, coma, or the like caused by the zooming by reducing spherical aberration, coma, or the like occurring in the third lens unit L3.

In addition, according to the present exemplary embodiment, since both surfaces of the positive lens 31 in the third lens unit L3 have an aspheric shape, it is possible to appropriately correct spherical aberration occurring in the third lens unit L3. That is, in the third lens unit L3, both surfaces of the positive lens closest to the object side have an aspherical shape. Focusing from an infinitely-distant object to a close object is performed by moving the fourth lens unit L4 towards the object side.

According to the present exemplary embodiment, since the fourth lens unit L4 is configured with a single positive lens, a load on an actuator for driving the fourth lens unit L4 during focusing is reduced. In addition, since at least one surface of the positive lens in the fourth lens unit L4 is aspheric, it is possible to reduce a variation of astigmatism or distortion caused by focusing.

According to the present exemplary embodiment, since the entire third lens unit L3 is moved to have a component perpendicular to the optical axis, it is possible to correct an image shake caused by hand vibration of a user.

According to the present exemplary embodiment, since the third lens unit L3 is configured such that aberration generated in the lens unit is reduced, it is possible to suppress aberration generated by decentering of the third lens unit L3.

Hereinafter, a zoom lens according to the second exemplary embodiment of the invention will be described with reference to FIG. 3. Similarly, the zoom lens according to the present exemplary embodiment is installed in an image pickup apparatus such as a digital camera.

According to the present exemplary embodiment, as illustrated in FIG. 3, unlike the first exemplary embodiment, the focal length of the first lens unit L1 is set to be slightly weak (long) so that the first lens unit L1 includes one negative lens 11$n$ and one positive lens 11$p$. Since the focal length of the first lens unit L1 is set to an appropriate value, it is possible to configure the first lens unit L1 with a small number of lenses while an increase of the entire lens length at the telephoto end is suppressed.

According to the present exemplary embodiment, unlike the first exemplary embodiment, the second lens unit L2 is moved towards the image side during zooming from the wide-angle end to the telephoto end. Other parameters are similar to those of the first exemplary embodiment.

Hereinafter, a zoom lens according to the third exemplary embodiment of the invention will be described with reference to FIG. 5. Similarly, the zoom lens according to the present exemplary embodiment is installed in an image pickup apparatus such as a digital camera.

According to the present exemplary embodiment, unlike the first exemplary embodiment, the focal length of the first lens unit L1 is set to be slightly weak (long) so that the first lens unit L1 includes two lenses. In addition, degradation of performance caused by an inclination or parallel decentering due to a manufacturing error in the first lens unit L1 is alleviated.

According to the present exemplary embodiment, since the focal length range of the first lens unit L1 is set to the range satisfying the condition (3), it is possible to alleviate the effect of a manufacturing error while an increase of the front lens effective diameter is suppressed. Other parameters are similar to those of the first exemplary embodiment.

Hereinafter, a zoom lens according to the fourth exemplary embodiment of the invention will be described with reference to FIG. 7. Similarly, the zoom lens of the present exemplary embodiment is installed in an image pickup apparatus such as a digital camera. Configurations of each lens unit or a zoom type according to the present exemplary embodiment are similar to those of the first exemplary embodiment.

Hereinafter, a zoom lens according to the fifth exemplary embodiment of the invention will be described with reference to FIG. 9. Similarly, the zoom lens of the present exemplary embodiment is installed in an image pickup apparatus such as a digital camera. Configurations of each lens unit or a zoom type according to the present exemplary embodiment are similar to those of the first exemplary embodiment. If the zoom lenses according to the first to fifth exemplary embodiments of the invention are combined with an image pickup apparatus having an image sensor that converts an optical image formed on a light-receiving surface into an electric signal, distortion of the image may be corrected using an electric unit.

Although the exemplary embodiments of the invention have been described hereinbefore, the invention is not limited thereto, and various modifications or changes may be made without departing from the spirit or scope of the invention.

Next, Numerical Examples 1 to 5 corresponding to the first to fifth exemplary embodiments will be described. In each numerical example, i is an integer greater than zero and denotes the order of the optical surface from the object side to the image side, ri denotes a radius of curvature of the i-th optical surface (i-th surface), di denotes a distance between the i-th surface and the (i+1)th surface, and ndi and vdi denote a refractive index and Abbe number, respectively, of a material of the i-th optical member for the Fraunhofer d-line.

In each numerical example, lens surfaces may have a combination of spherical and aspherical optical surfaces. Surfaces having an aspherical shape are denoted by an asterisk (*) added next to the surface number. In addition, if k denotes eccentricity of an aspherical surface, A4, A6, A8, and A10 denote aspheric coefficients, and x denotes a displacement in the optical axis direction at the position of a height h from the optical axis with respect to a surface vertex, the aspheric shape can be expressed as follows:

$$x=(h^2/R)/\{1+[1-(1+k)(h/R)^2]^{1/2}\}+A4h^4+A6h^6+A8h^8+A10h^{10},$$

where R denotes a radius of curvature and k is a conic constant. Values expressed in scientific notation "1E-Z" are equivalent to values expressed in exponential notation "1×10$^{-Z}$". Bf denotes the back focus which is a distance to the image plane from the surface closest to the image side (e.g., a last surface) of the glass block G.

In the numerical examples, the last four surfaces are surfaces of the optical block such as a filter or a phase plate. In addition, a relation between the conditions and the numerical examples described above is represented in Table 1.

Numerical Example 1

Unit: mm

| Surface data | | | | | |
|---|---|---|---|---|---|
| Surface number | r | d | nd | vd | Effective diameter |
| 1 | 421.807 | 1.90 | 1.84666 | 23.8 | 42.83 |
| 2 | 78.080 | 3.06 | 1.77250 | 49.6 | 37.85 |
| 3 | 6648.973 | 0.17 | | | 37.62 |
| 4 | 59.747 | 2.99 | 1.77250 | 49.6 | 32.62 |
| 5 | 786.209 | Variable | | | 31.62 |
| 6* | 1157.447 | 1.50 | 1.85400 | 40.4 | 28.94 |
| 7* | 16.239 | 6.00 | | | 22.71 |
| 8 | −57.504 | 1.04 | 1.69680 | 55.5 | 22.62 |
| 9 | 84.905 | 0.06 | | | 22.53 |
| 10 | 27.402 | 2.54 | 1.94595 | 18.0 | 22.78 |
| 11 | 73.574 | Variable | | | 22.44 |
| 12* | 17.932 | 2.81 | 1.85400 | 40.4 | 13.04 |
| 13* | 167.615 | 0.14 | | | 12.63 |
| 14 | 13.651 | 4.31 | 1.77250 | 49.6 | 12.13 |
| 15 | −429.432 | 0.58 | 1.80518 | 25.5 | 10.36 |
| 16 | 8.820 | 1.62 | | | 9.20 |
| 17 | −339.608 | 2.19 | 1.56907 | 71.3 | 9.16 |
| 18 | −36.249 | 1.24 | | | 8.99 |
| 19 (Stop) | ∞ | Variable | | | 8.55 |
| 20 | 130.589 | 5.75 | 1.55332 | 71.7 | 28.33 |
| 21* | −47.989 | Variable | | | 28.88 |
| 22 | ∞ | 2.30 | 1.51633 | 64.1 | 58.97 |
| 23 | ∞ | 1.47 | | | 58.97 |
| 24 | ∞ | 1.47 | 1.51633 | 64.1 | 58.97 |
| 25 | ∞ | 0.36 | | | 76.40 |
| Image plane | ∞ | | | | |

Aspheric data

6th surface

K = 0.00000e+000 A4 = −7.36552e−006 A6 = 1.33239e−008

7th surface

K = 1.75713e−001 A4 = −8.39318e−006 A6 = −1.17953e−008
A8 = −2.75012e−010 A10 = 9.21784e−013

12th surface

K = −5.40526e−002 A4 = −8.38299e−006 A6 = −4.05095e−008
A8 = 1.06809e−009 A10 = −8.62869e−012

13th surface

K = 1.32760e+002 A4 = 3.41582e−006 A6 = 1.28000e−008

21st surface

K = 6.55609e+000 A4 = 3.09910e−006 A6 = 2.03117e−008
A8 = −1.03594e−010 A10 = 6.24625e−013

Various data
Zoom ratio 3.80

| | Wide angle | Middle | Telephoto |
|---|---|---|---|
| Focal length | 18.17 | 35.12 | 69.05 |
| F-number | 2.89 | 4.58 | 5.94 |
| Angle of view | 33.37 | 20.87 | 11.14 |
| Image height | 11.97 | 13.39 | 13.60 |
| Total lens length | 86.88 | 89.56 | 110.05 |
| BF | 0.36 | 0.36 | 0.36 |
| d 5 | 1.07 | 1.90 | 17.23 |
| d11 | 23.03 | 9.06 | 1.16 |
| d19 | 13.02 | 31.19 | 44.17 |
| d21 | 6.26 | 3.90 | 3.97 |
| Entrance pupil position | 26.33 | 25.33 | 56.33 |
| Exit pupil position | −32.12 | −80.88 | −183.46 |

-continued

| | | | |
|---|---|---|---|
| Front-side principal point position | 34.34 | 45.27 | 99.44 |
| Rear-side principal point position | −17.81 | −34.76 | −68.69 |

Zoom lens unit data

| Unit | Starting surface | Focal length | Lens configuration length | Front-side principal point position | Rear-side principal point position |
|---|---|---|---|---|---|
| 1 | 1 | 77.73 | 8.12 | 2.49 | −2.13 |
| 2 | 6 | −20.02 | 11.14 | 0.76 | −7.97 |
| 3 | 12 | 23.54 | 12.89 | −4.21 | −11.67 |
| 4 | 20 | 64.16 | 5.75 | 2.74 | −1.01 |
| 5 | 22 | ∞ | 5.25 | 1.98 | −1.98 |

Single lens data

| Lens | Starting surface | Focal length |
|---|---|---|
| 1 | 1 | −113.46 |
| 2 | 2 | 102.25 |
| 3 | 4 | 83.55 |
| 4 | 6 | −19.30 |
| 5 | 8 | −49.06 |
| 6 | 10 | 44.96 |
| 7 | 12 | 23.31 |
| 8 | 14 | 17.20 |
| 9 | 15 | −10.73 |
| 10 | 17 | 71.12 |
| 11 | 20 | 64.16 |
| 12 | 22 | 0.00 |
| 13 | 24 | 0.00 |

Numerical Example 2

Unit: mm

Surface data

| Surface number | r | d | nd | vd | Effective diameter |
|---|---|---|---|---|---|
| 1 | 52.908 | 1.85 | 1.84666 | 23.8 | 43.40 |
| 2 | 37.323 | 5.95 | 1.77250 | 49.6 | 39.35 |
| 3 | 231.928 | Variable | | | 38.20 |
| 4 | 1035.087 | 1.62 | 1.88300 | 40.8 | 33.55 |
| 5 | 17.968 | 7.23 | | | 26.07 |
| 6 | −69.079 | 1.22 | 1.69680 | 55.5 | 25.94 |
| 7 | 41.351 | 0.44 | | | 25.91 |
| 8 | 30.195 | 4.42 | 1.84666 | 23.8 | 26.60 |
| 9 | −836.949 | Variable | | | 26.35 |
| 10* | 16.989 | 4.73 | 1.77250 | 49.6 | 13.79 |
| 11* | ∞ | 0.12 | | | 12.87 |
| 12* | 21.813 | 3.81 | 1.85400 | 40.8 | 12.41 |
| 13 | −95.861 | 0.58 | 1.78472 | 25.7 | 11.01 |
| 14 | 10.701 | 1.76 | | | 9.95 |
| 15 | −49.698 | 2.47 | 1.56907 | 71.3 | 9.90 |
| 16 | −26.220 | 1.16 | | | 9.85 |
| 17 (Stop) | ∞ | Variable | | | 9.38 |
| 18* | 139.279 | 4.19 | 1.67790 | 55.3 | 27.77 |
| 19 | −67.944 | Variable | | | 28.06 |
| 20 | ∞ | 2.30 | 1.51633 | 64.1 | 46.30 |
| 21 | ∞ | 1.47 | 1.51633 | 64.1 | 46.30 |
| 22 | ∞ | 2.48 | | | 46.30 |
| Image plane | ∞ | | | | |

Aspheric data

10th surface

K = 7.25609e−001 A4 = −3.17517e−005 A6 = −3.07295e−007
A8 = 4.77829e−009 A10 = −1.06641e−010

11th surface

K = 2.72634e+010 A4 = 7.95989e−005 A6 = −1.44775e−006

12th surface

K = 5.66199e+000 A4 = −7.86793e−006 A6 = −1.53476e−006
A8 = −1.25669e−008

18th surface

K = 0.00000e+000 A4 = 2.85271e−006 A6 = 6.84413e−009
A8 = −1.22411e−011 A10 = −9.84034e−015

Various data
Zoom ratio: 3.80

| | Wide angle | Middle | Telephoto |
|---|---|---|---|
| Focal length | 18.15 | 36.13 | 68.98 |
| F-number | 2.91 | 4.12 | 6.00 |
| Angle of view | 33.4 | 20.63 | 11.15 |
| Image height | 11.97 | 13.60 | 13.60 |
| Total lens length | 101.95 | 106.99 | 121.63 |
| BF | 2.48 | 2.48 | 2.48 |
| d 3 | 1.63 | 10.57 | 23.08 |
| d 9 | 29.49 | 12.70 | 1.16 |
| d17 | 14.60 | 31.52 | 44.60 |
| d19 | 8.42 | 4.39 | 4.97 |
| Entrance pupil position | 30.94 | 46.10 | 76.82 |
| Exit pupil position | −33.17 | −72.70 | −153.65 |
| Front-side principal point position | 39.85 | 64.87 | 115.32 |
| Rear-side principal point position | −15.67 | −33.65 | −66.50 |

Zoom lens unit data

| Unit | Starting surface | Focal length | Lens configuration length | Front-side principal point position | Rear-side principal point position |
|---|---|---|---|---|---|
| 1 | 1 | 91.52 | 7.80 | −1.51 | −5.79 |
| 2 | 4 | −22.90 | 14.93 | −0.09 | −12.33 |
| 3 | 10 | 27.98 | 14.63 | −3.61 | −12.50 |
| 4 | 18 | 67.92 | 4.19 | 1.69 | −0.83 |
| 5 | 20 | ∞ | 3.77 | 1.24 | −1.24 |

Single lens data

| Lens | Starting surface | Focal length |
|---|---|---|
| 1 | 1 | −158.27 |
| 2 | 2 | 56.82 |
| 3 | 4 | −20.72 |
| 4 | 6 | −36.96 |
| 5 | 8 | 34.50 |
| 6 | 10 | 21.99 |
| 7 | 12 | 21.12 |
| 8 | 13 | −12.24 |
| 9 | 15 | 93.94 |
| 10 | 18 | 67.92 |
| 11 | 20 | 0.00 |
| 12 | 21 | 0.00 |

Numerical Example 3

Unit: mm

Surface data

| Surface number | r | d | nd | vd | Effective diameter |
|---|---|---|---|---|---|
| 1 | 54.830 | 1.85 | 1.84666 | 23.8 | 43.40 |
| 2 | 39.339 | 5.95 | 1.77250 | 49.6 | 39.35 |
| 3 | 232.979 | Variable | | | 38.20 |
| 4 | 500.821 | 1.62 | 1.88300 | 40.8 | 33.55 |
| 5 | 16.315 | 7.90 | | | 26.07 |
| 6 | −61.217 | 1.22 | 1.69680 | 55.5 | 25.94 |
| 7 | 40.459 | 0.44 | | | 25.91 |
| 8 | 29.325 | 4.42 | 1.84666 | 23.8 | 26.60 |
| 9 | −3565.265 | Variable | | | 26.35 |
| 10* | 17.394 | 4.73 | 1.77250 | 49.6 | 13.79 |
| 11* | ∞ | 0.12 | | | 12.87 |
| 12* | 22.023 | 3.81 | 1.85400 | 40.4 | 12.41 |
| 13 | −74.918 | 0.58 | 1.78472 | 25.7 | 11.01 |
| 14 | 11.228 | 1.76 | | | 9.95 |
| 15 | −57.540 | 2.47 | 1.56907 | 71.3 | 9.90 |
| 16 | −24.163 | 1.16 | | | 9.85 |
| 17 (Stop) | ∞ | Variable | | | 9.38 |
| 18* | 84.311 | 4.19 | 1.67790 | 55.3 | 27.77 |
| 19 | −89.710 | Variable | | | 28.06 |
| 20 | ∞ | 2.30 | 1.51633 | 64.1 | 46.30 |
| 21 | ∞ | 1.47 | 1.51633 | 64.1 | 46.30 |
| 22 | ∞ | 0.69 | | | 46.30 |
| Image plane | ∞ | | | | |

Aspheric data

10th surface

K = 6.64673e−001 A4 = −2.66584e−005 A6 = −1.11672e−007
A8 = 2.13129e−009 A10 = −6.68542e−011

11th surface

K = 2.72634e+010 A4 = 9.35359e−005 A6 = −1.27741e−006

12th surface

K = 5.41428e+000 A4 = 3.27539e−006 A6 = −1.42230e−006
A8 = −1.04263e−008

18th surface

K = 0.00000e+000 A4 = 2.71294e−006 A6 = −1.23055e−009
A8 = 5.69183e−011 A10 = −1.66408e−013

Various data
Zoom ratio: 3.80

| | Wide angle | Middle | Telephoto |
|---|---|---|---|
| Focal length | 18.15 | 35.01 | 68.98 |
| F-number | 3.01 | 4.21 | 6.00 |
| Angle of view | 33.40 | 21.23 | 11.15 |
| Image height | 11.97 | 13.60 | 13.60 |
| Total lens length | 100.19 | 106.93 | 127.48 |
| BF | 0.69 | 0.69 | 0.69 |
| d 3 | 3.51 | 11.60 | 28.63 |
| d 9 | 24.23 | 10.21 | 0.29 |
| d17 | 19.70 | 35.26 | 45.34 |
| d19 | 6.04 | 3.17 | 6.52 |
| Entrance pupil position | 31.22 | 44.94 | 91.19 |
| Exit pupil position | −40.75 | −90.53 | −176.18 |
| Front-side principal point position | 41.42 | 66.52 | 133.26 |
| Rear-side principal point position | −17.45 | −34.32 | −68.29 |

Zoom lens unit data

| Unit | Starting surface | Focal length | Lens configuration length | Front-side principal point position | Rear-side principal point position |
|---|---|---|---|---|---|
| 1 | 1 | 95.49 | 7.80 | −1.56 | −5.83 |
| 2 | 4 | −20.10 | 15.60 | 0.30 | −12.49 |
| 3 | 10 | 25.89 | 14.63 | −2.22 | −11.61 |
| 4 | 18 | 64.74 | 4.19 | 1.22 | −1.30 |
| 5 | 20 | ∞ | 3.77 | 1.24 | −1.24 |

Single lens data

| Lens | Starting surface | Focal length |
|---|---|---|
| 1 | 1 | −173.99 |
| 2 | 2 | 60.46 |
| 3 | 4 | −19.13 |
| 4 | 6 | −34.79 |
| 5 | 8 | 34.37 |
| 6 | 10 | 22.52 |
| 7 | 12 | 20.30 |
| 8 | 13 | −12.41 |
| 9 | 15 | 71.28 |
| 10 | 18 | 64.74 |
| 11 | 20 | 0.00 |
| 12 | 21 | 0.00 |

Numerical Example 4

Unit: mm

Surface data

| Surface number | r | d | nd | vd | Effective diameter |
|---|---|---|---|---|---|
| 1 | 326.011 | 1.90 | 1.84666 | 23.8 | 42.83 |
| 2 | 71.099 | 3.06 | 1.77250 | 49.6 | 37.85 |
| 3 | −8292.749 | 0.17 | | | 37.62 |
| 4 | 58.390 | 2.99 | 1.77250 | 49.6 | 32.62 |
| 5 | 1267.702 | Variable | | | 31.62 |
| 6* | 1350.283 | 1.50 | 1.85400 | 40.4 | 28.94 |
| 7* | 16.280 | 6.00 | | | 22.71 |
| 8 | −57.041 | 1.04 | 1.69680 | 55.5 | 22.62 |
| 9 | 84.563 | 0.06 | | | 22.53 |
| 10 | 27.402 | 0.00 | | | 22.78 |
| 11 | 27.402 | 0.00 | | | 22.78 |
| 12 | 27.426 | 2.54 | 1.94595 | 18.0 | 22.78 |
| 13 | 72.354 | Variable | | | 22.44 |
| 14* | 17.991 | 2.81 | 1.85400 | 40.4 | 13.04 |
| 15* | 174.096 | 0.14 | | | 12.63 |
| 16 | 13.656 | 4.31 | 1.77250 | 49.6 | 12.13 |
| 17 | −1213.432 | 0.58 | 1.80518 | 25.5 | 10.36 |
| 18 | 8.817 | 1.62 | | | 9.20 |
| 19 | −339.608 | 2.19 | 1.56907 | 71.3 | 9.16 |
| 20 | −36.651 | 1.24 | | | 8.99 |
| 21 (Stop) | ∞ | Variable | | | 8.55 |
| 22 | 95.177 | 5.75 | 1.55332 | 71.7 | 28.33 |
| 23* | −51.473 | Variable | | | 28.88 |
| 24 | ∞ | 2.30 | 1.51633 | 64.1 | 58.97 |
| 25 | ∞ | 1.47 | | | 58.97 |

-continued

| | | | | | |
|---|---|---|---|---|---|
| 26 | ∞ | 1.47 | 1.51633 | 64.1 | 58.97 |
| 27 | ∞ | 0.73 | | | 76.40 |
| Image plane | ∞ | | | | |

Aspheric data

6th surface

K = 2.65891e+003 A4 = −7.62168e−006 A6 = 1.42295e−008

7th surface

K = 1.84790e−001 A4 = −8.63604e−006 A6 = 1.30060e−009
A8 = −4.06805e−010 A10 = 1.61210e−012

14th surface

K = −8.20846e−003 A4 = −1.11343e−005 A6 = −1.99977e−008
A8 = 7.05572e−010 A10 = −3.92137e−012

15th surface

K = 1.88011e+002 A4 = 9.89225e−008 A6 = 2.88524e−008

23rd surface

K = 5.08936e+000 A4 = 1.45132e−006 A6 = 1.02009e−009
A8 = −3.61854e−011 A10 = 2.95969e−013

Various data
Zoom ratio: 3.80

| | Wide angle | Middle | Telephoto |
|---|---|---|---|
| Focal length | 18.17 | 35.35 | 69.05 |
| F-number | 2.89 | 4.58 | 5.94 |
| Angle of view | 33.37 | 20.75 | 11.14 |
| Image height | 11.97 | 13.39 | 13.60 |
| Total lens length | 86.05 | 88.12 | 105.84 |
| BF | 0.73 | 0.73 | 0.73 |
| d 5 | 0.47 | 0.86 | 13.54 |
| d13 | 23.06 | 8.94 | 0.93 |
| d21 | 13.26 | 32.23 | 46.37 |
| d23 | 5.38 | 2.21 | 1.12 |
| Entrance pupil position | 25.98 | 24.17 | 49.19 |
| Exit pupil position | −31.77 | −87.39 | −246.91 |
| Front-side principal point position | 33.99 | 45.34 | 98.98 |
| Rear-side principal point position | −17.44 | −34.62 | −68.32 |

Zoom lens unit data

| Unit | Starting surface | Focal length | Lens configuration length | Front-side principal point position | Rear-side principal point position |
|---|---|---|---|---|---|
| 1 | 1 | 70.35 | 8.12 | 2.47 | −2.15 |
| 2 | 6 | −19.83 | 11.14 | 0.81 | −7.90 |
| 3 | 14 | 23.59 | 12.89 | −4.24 | −11.69 |
| 4 | 22 | 61.23 | 5.75 | 2.44 | −1.32 |
| 5 | 24 | ∞ | 5.25 | 1.98 | −1.98 |

Single lens data

| Lens | Starting surface | Focal length |
|---|---|---|
| 1 | 1 | −107.77 |
| 2 | 2 | 91.27 |
| 3 | 4 | 79.15 |
| 4 | 6 | −19.31 |
| 5 | 8 | −48.74 |
| 6 | 12 | 45.44 |
| 7 | 14 | 23.30 |
| 8 | 16 | 17.51 |
| 9 | 17 | −10.87 |
| 10 | 19 | 72.01 |
| 11 | 22 | 61.23 |
| 12 | 24 | 0.00 |
| 13 | 26 | 0.00 |

Numerical Example 5

Unit: mm

Surface data

| Surface number | r | d | nd | vd | Effective diameter |
|---|---|---|---|---|---|
| 1 | 360.164 | 1.90 | 1.84666 | 23.8 | 42.83 |
| 2 | 59.459 | 3.47 | 1.80400 | 46.6 | 37.85 |
| 3 | 2274.691 | 0.17 | | | 37.62 |
| 4 | 58.536 | 2.99 | 1.83481 | 42.7 | 32.62 |
| 5 | 684.419 | Variable | | | 31.62 |
| 6* | 1430.577 | 1.50 | 1.85400 | 40.4 | 28.94 |
| 7* | 16.143 | 6.00 | | | 22.71 |
| 8 | −57.825 | 1.04 | 1.69680 | 55.5 | 22.62 |
| 9 | 86.303 | 0.06 | | | 22.53 |
| 10 | 27.276 | 2.54 | 1.94595 | 18.0 | 22.78 |
| 11 | 72.732 | Variable | | | 22.44 |
| 12* | 17.984 | 2.81 | 1.85400 | 40.4 | 13.04 |
| 13* | 164.275 | 0.14 | | | 12.63 |
| 14 | 13.654 | 4.31 | 1.77250 | 49.6 | 12.13 |
| 15 | −538.461 | 0.58 | 1.80518 | 25.5 | 10.36 |
| 16 | 8.813 | 1.62 | | | 9.20 |
| 17 | −339.608 | 2.19 | 1.56907 | 71.3 | 9.16 |
| 18 | −37.219 | 1.24 | | | 8.99 |
| 19 (Stop) | ∞ | Variable | | | 8.55 |
| 20 | 70.520 | 5.75 | 1.55332 | 71.7 | 28.33 |
| 21* | −50.802 | Variable | | | 28.88 |
| 22 | ∞ | 2.30 | 1.51633 | 64.1 | 58.97 |
| 23 | ∞ | 1.47 | | | 58.97 |
| 24 | ∞ | 1.47 | 1.51633 | 64.1 | 58.97 |
| 25 | ∞ | 0.35 | | | 76.40 |
| Image plane | ∞ | | | | |

Aspheric data

6th surface

K = 2.65891e+003 A4 = −6.06688e−006 A6 = 9.24438e−009

7th surface

K = 1.23928e−001 A4 = −5.47083e−006 A6 = −1.95098e−008
A8 = −3.95102e−011 A10 = −2.01355e−013

12th surface

K = 4.77692e−002 A4 = −1.02633e−005 A6 = −3.50577e−008
A8 = 1.34441e−009 A10 = −9.17781e−012

13th surface

K = 1.87915e+002 A4 = 1.17325e−006 A6 = 3.35300e−008

21st surface

K = 2.82666e+000 A4 = −4.34400e−006 A6 = 3.26736e−008
A8 = −1.61341e−010 A10 = 3.97817e−013

Various data
Zoom ratio: 3.80

| | Wide angle | Middle | Telephoto |
|---|---|---|---|
| Focal length | 18.17 | 35.17 | 69.05 |
| F-number | 2.89 | 4.58 | 5.94 |
| Angle of view | 33.37 | 20.85 | 11.14 |
| Image height | 11.97 | 13.39 | 13.60 |
| Total lens length | 87.08 | 89.09 | 106.72 |
| BF | 0.35 | 0.35 | 0.35 |
| d 5 | 0.64 | 0.86 | 13.29 |
| d11 | 23.19 | 9.02 | 1.04 |
| d19 | 14.33 | 33.00 | 47.90 |
| d21 | 5.01 | 2.29 | 0.57 |
| Entrance pupil position | 26.48 | 24.33 | 48.77 |
| Exit pupil position | −34.29 | −107.86 | −653.93 |

-continued

| | |  |  |
|---|---|---|---|
| Front-side principal point position | 35.12 | 48.07 | 110.53 |
| Rear-side principal point position | −17.82 | −34.82 | −68.71 |

Zoom lens unit data

| Unit | Starting surface | Focal length | Lens configuration length | Front-side principal point position | Rear-side principal point position |
|---|---|---|---|---|---|
| 1 | 1 | 70.03 | 8.53 | 2.60 | −2.17 |
| 2 | 6 | −19.95 | 11.14 | 0.73 | −8.01 |
| 3 | 12 | 23.85 | 12.89 | −4.35 | −11.76 |
| 4 | 20 | 54.28 | 5.75 | 2.19 | −1.58 |
| 5 | 22 | ∞ | 5.25 | 1.98 | −1.98 |

Single lens data

| Lens | Starting surface | Focal length |
|---|---|---|
| 1 | 1 | −84.36 |
| 2 | 2 | 75.89 |
| 3 | 4 | 76.51 |
| 4 | 6 | −19.13 |
| 5 | 8 | −49.55 |
| 6 | 10 | 44.92 |
| 7 | 12 | 23.44 |
| 8 | 14 | 17.30 |
| 9 | 15 | −10.76 |
| 10 | 17 | 73.26 |
| 11 | 20 | 54.28 |
| 12 | 22 | 0.00 |
| 13 | 24 | 0.00 |

TABLE 1

| Condition | Example 1 | Example 2 | Example 3 | Example 4 | Example 5 |
|---|---|---|---|---|---|
| (1) T23/ft | 0.017 | 0.017 | 0.004 | 0.008 | 0.015 |
| (2) f3/f2 | −1.18 | −1.22 | −1.29 | −1.19 | −1.20 |
| (3) f1/f2 | −3.88 | −4.00 | −4.75 | −3.55 | −3.51 |
| (4) Nav1 | 1.77 | 1.77 | 1.77 | 1.77 | 1.82 |

Next, a digital still camera in which the zoom lens according to each exemplary embodiment of the invention is used as an example of a photographic optical system will be described with reference to FIG. 11. In FIG. 11, reference numeral 120 denotes a camera body, and reference numeral 121 denotes a photographic optical system including any one of the zoom lens embodiments described in the first to fifth exemplary embodiments.

Reference numeral 122 denotes a solid-state image sensor (photoelectric conversion element) such as a CCD (charge-coupled device) sensor or a CMOS (complementary metal oxide semiconductor) sensor, which is mounted in the camera body 120 and receives an object image formed by the photographic optical system 121. Reference numeral 123 denotes a memory for recording information corresponding to an object image photoelectrically converted by the solid-state image sensor 122. Reference numeral 124 denotes a viewfinder including a liquid crystal display panel and the like to observe an object image formed on the solid-state image sensor 122.

In this manner, it is possible to implement a miniaturized image pickup apparatus having high optical performance by applying the zoom lens according an exemplary embodiment of the invention to an image pickup apparatus such as a digital camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-121933 filed May 31, 2011, which is hereby incorporated by reference herein in its entirety.

What is claimed is:

1. A zoom lens comprising, in order from an object side to an image side and arranged along an optical axis thereof, a first lens unit having positive refractive power, a second lens unit having negative refractive power, a third lens unit having positive refractive power, and a fourth lens unit having positive refractive power, all of the lens units being moved during zooming from a wide-angle end to a telephoto end,
wherein an aperture stop is arranged on the image side of the third lens unit,
wherein the third lens unit includes at least three positive lenses and one negative lens, and
wherein the zoom lens satisfies the following conditions:

$$0.002 < T23/fT < 0.020$$

$$-1.8 < f3/f2 < -0.8, \text{ and}$$

$$-5.0 < f1/f2 < -3.0,$$

where T23 denotes a distance from a lens surface closest to the image side in the second lens unit to a lens surface closest to the object side in the third lens unit when the zoom lens is at the telephoto end, fT denotes a focal length of the entire zoom lens at the telephoto end, and f1, f2, and f3 denote focal lengths of the first, second, and third lens units, respectively.

2. The zoom lens according to claim 1, wherein a condition Nav1>1.75 is satisfied, where Nav1 denotes an average refractive index of materials of all positive lenses in the first lens unit.

3. The zoom lens according to claim 1, wherein focusing is performed by moving the fourth lens unit in an optical axis direction.

4. The zoom lens according to claim 1, wherein the first lens unit includes, in order from the object side to the image side, a cemented lens consisting of a negative lens and a positive lens, and a positive lens.

5. The zoom lens according to claim 1, wherein the third lens unit includes, in order from the object side to the image side, a positive lens, a cemented lens consisting of a positive lens and a negative lens, and a positive lens.

6. The zoom lens according to claim 1, wherein the first lens unit includes, in order from the object side to the image side, a negative lens and a positive lens.

7. The zoom lens according to claim 1, wherein the third lens unit is moved to have at least one component thereof perpendicular to the optical axis.

8. The zoom lens according to claim 1, wherein during zooming from the wide-angle end to the telephoto end the first, second and third lens units are moved towards the object side.

9. The zoom lens according to claim 1, wherein during zooming from the wide-angle end to the telephoto end the second lens unit is moved toward the image side.

10. An image pickup apparatus comprising:
a zoom lens; and
an image sensor configured to receive an image formed by the zoom lens,
the zoom lens comprising, in order from an object side to an image side and arranged along an optical axis thereof, a first lens unit having positive refractive power, a second lens unit having negative refractive power, a third lens unit having positive refractive power, and a fourth lens unit having positive refractive power, all of the lens units being moved during zooming from a wide-angle end to a telephoto end, wherein an aperture stop is arranged on the image side of the third lens unit, wherein the third lens unit includes at least three positive lenses and one negative lens, and wherein the zoom lens satisfies the following conditions:

$$0.002 < T23/fT < 0.020$$

$$-1.8 < f3/f2 < -0.8, \text{ and}$$

$$-5.0 < f1/f2 < -3.0,$$

where T23 denotes a distance from a lens surface closest to the image side in the second lens unit to a lens surface closest to the object side in the third lens unit when the zoom lens is at the telephoto end, fT denotes a focal length of the entire zoom lens at the telephoto end, and f1, f2, and f3 denote focal lengths of the first, second, and third lens units, respectively.

* * * * *